US011677775B2

(12) United States Patent
Sharma et al.

(10) Patent No.: US 11,677,775 B2
(45) Date of Patent: Jun. 13, 2023

(54) SYSTEM AND METHOD FOR EMULATING A MULTI-STAGE ATTACK ON A NODE WITHIN A TARGET NETWORK

(71) Applicant: AttackIQ, Inc., San Diego, CA (US)

(72) Inventors: Rajesh Sharma, San Diego, CA (US); Jeremy Miller, San Diego, CA (US); Stephan Chenette, San Diego, CA (US); Albert Lopez, San Diego, CA (US); Shubhi Mittal, San Diego, CA (US); Andres Gazzoli, San Diego, CA (US)

(73) Assignee: AttackIQ, Inc., San Diego, CA (US)

( * ) Notice: Subject to any disclaimer, the term of this patent is extended or adjusted under 35 U.S.C. 154(b) by 0 days.

(21) Appl. No.: 17/832,106

(22) Filed: Jun. 3, 2022

(65) Prior Publication Data

US 2022/0377102 A1    Nov. 24, 2022

Related U.S. Application Data

(63) Continuation-in-part of application No. 17/083,275, filed on Oct. 28, 2020, now Pat. No. 11,563,765.

(60) Provisional application No. 63/196,320, filed on Jun. 3, 2021, provisional application No. 63/008,451, filed on Apr. 10, 2020.

(51) Int. Cl.
 *H04L 9/40* (2022.01)
(52) U.S. Cl.
 CPC ................................ *H04L 63/1433* (2013.01)

(58) Field of Classification Search
 None
 See application file for complete search history.

(56) References Cited

U.S. PATENT DOCUMENTS

| | | | | |
|---|---|---|---|---|
| 6,907,396 | B1* | 6/2005 | Muttik | G06F 21/56 |
| | | | | 703/22 |
| 9,892,260 | B2* | 2/2018 | Kotler | G06F 21/577 |
| 10,200,259 | B1* | 2/2019 | Pukish | H04L 69/326 |
| 10,868,825 | B1* | 12/2020 | Dominessy | H04L 63/1433 |
| 11,336,669 | B2* | 5/2022 | Bazalgette | H04L 63/1483 |
| 2007/0011319 | A1* | 1/2007 | McClure | H04L 63/145 |
| | | | | 709/224 |
| 2008/0271146 | A1* | 10/2008 | Rooney | H04L 63/1425 |
| | | | | 726/23 |

(Continued)

*Primary Examiner* — Kambiz Zand
*Assistant Examiner* — Mahabub S Ahmed
(74) *Attorney, Agent, or Firm* — Run8 Patent Group, LLC; Peter Miller; Brian T. Chew

(57) ABSTRACT

A method includes: accessing an attack record defining actions representing a previous known attack on a second computer network; initializing an attack graph; for each action, defining a set of behaviors—analogous to the action and executable by an asset on a target network to emulate an effect of the action on the second computer network—and storing the set of behaviors in a node in the attack graph; connecting nodes in the attack graph according to an order of actions in the known attack; scheduling the asset to selectively execute analogous behaviors stored in the set of nodes in the attack graph; accessing alerts generated by a set of security tools deployed on the target network; and characterizing vulnerability of the target network based on alerts, in the set of alerts, indicating detection and prevention of behaviors executed by the asset according to the attack graph.

20 Claims, 5 Drawing Sheets

(56) References Cited

U.S. PATENT DOCUMENTS

| | | | | |
|---|---|---|---|---|
| 2009/0320137 | A1* | 12/2009 | White | H04L 63/1433 707/999.102 |
| 2010/0138925 | A1* | 6/2010 | Barai | H04L 63/1433 726/25 |
| 2012/0151596 | A1* | 6/2012 | McClure | H04L 63/145 726/25 |
| 2014/0325634 | A1* | 10/2014 | Iekel-Johnson | H04L 63/101 726/13 |
| 2015/0020199 | A1* | 1/2015 | Neil | G06N 5/022 726/23 |
| 2015/0128246 | A1* | 5/2015 | Feghali | H04L 63/0209 726/13 |
| 2015/0295948 | A1* | 10/2015 | Hassell | H04L 63/1441 726/25 |
| 2016/0205122 | A1* | 7/2016 | Bassett | H04L 63/1416 726/23 |
| 2016/0261631 | A1* | 9/2016 | Vissamsetty | H04L 63/1491 |
| 2016/0308895 | A1* | 10/2016 | Kotler | G06F 21/577 |
| 2017/0126712 | A1* | 5/2017 | Crabtree | G06N 20/00 |
| 2017/0220964 | A1* | 8/2017 | Datta Ray | G06Q 10/0635 |
| 2017/0279832 | A1* | 9/2017 | Di Pietro | H04L 63/1458 |
| 2017/0289187 | A1* | 10/2017 | Noel | G06F 16/9024 |
| 2018/0004942 | A1* | 1/2018 | Martin | G06F 21/554 |
| 2018/0103052 | A1* | 4/2018 | Choudhury | H04L 63/20 |
| 2018/0152468 | A1* | 5/2018 | Nor | H04L 43/08 |
| 2019/0245883 | A1* | 8/2019 | Gorodissky | H04L 63/1433 |
| 2020/0067969 | A1* | 2/2020 | Abbaszadeh | G06F 18/10 |
| 2020/0128047 | A1* | 4/2020 | Biswas | H04L 67/10 |
| 2020/0244673 | A1* | 7/2020 | Stockdale | G06N 7/01 |
| 2021/0144159 | A1* | 5/2021 | Sanghvi | H04L 63/1425 |
| 2021/0194924 | A1* | 6/2021 | Heinemeyer | G06F 21/577 |
| 2021/0314341 | A1* | 10/2021 | Moskovich | H04L 63/20 |
| 2022/0078210 | A1* | 3/2022 | Crabtree | G06F 16/9024 |

* cited by examiner

SYSTEM AND METHOD FOR EMULATING A MULTI-STAGE ATTACK ON A NODE WITHIN A TARGET NETWORK

CROSS-REFERENCE TO RELATED APPLICATIONS

This Application claims the benefit of U.S. Provisional Application No. 63/196,320, filed on Jun. 3, 2021, which is incorporated in its entirety by this reference.

This Application is a continuation-in-part application of U.S. patent application Ser. No. 17/083,275, filed on Oct. 28, 2020, which claims the benefit of U.S. Provisional Application No. 63/008,451, filed on Apr. 10, 2020, each of which is incorporated in its entirety by this reference.

TECHNICAL FIELD

This invention relates generally to the field of internet security and more specifically to a new and useful method for emulating multistate attacks at a node on a network in the field of internet security testing and validation.

DESCRIPTION OF THE EMBODIMENTS

Figure 1:
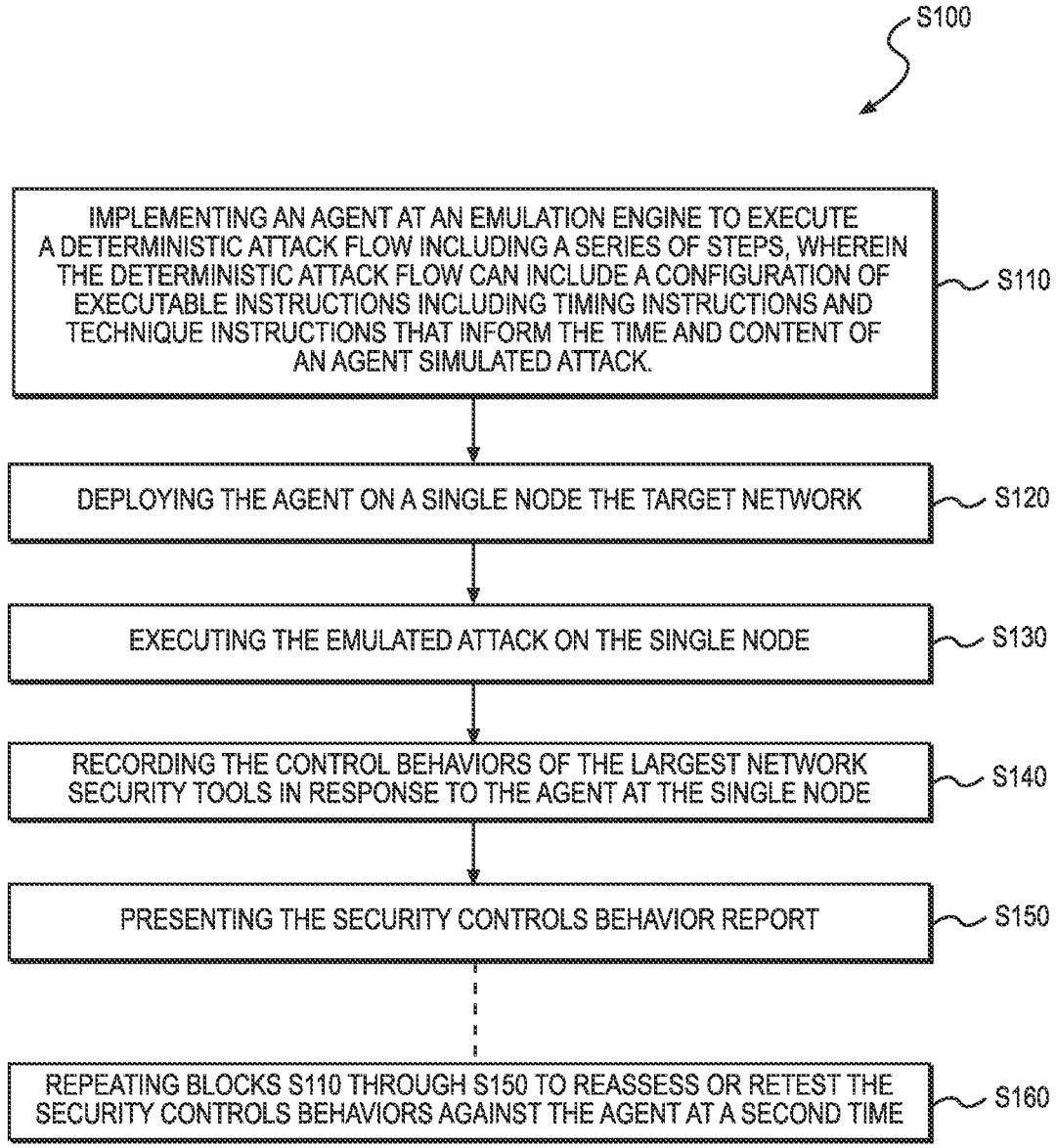
FIG. 1 is a flowchart representation of a first method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

As shown in the FIGURES, a first method S100 for emulating a multi-stage attack on a target network can include implementing an agent at an emulation engine to execute a deterministic attack flow including a series of steps in Block S110. The deterministic attack flow can include a configuration of executable instructions including timing instructions and technique instructions that inform the time and content of an agent simulated attack. The first method S100 can also include deploying the agent on a single node in the target network in Block S120. The first method S100 can also include executing the emulated attack on the single node in Block S130; and recording the control behaviors of the target network security tools in response to the agent at the single node in Block S140. Generally, control behaviors can include the detection, prevention, and continuation of the agent at the single node in the target network. The first method S100 can also include presenting a security controls behavior report in Block S150, which can include visualizations and descriptions of agent behavior and security controls behaviors as well as suggestions for improving security controls behaviors in response to the agent.

In one variation of an example implementation, the first method S100 can also include Block S160, which includes repeating Blocks S110 through S150 to reassess or retest the security controls behaviors against the agent at a second time.

In another variation of an example implementation, the first method S100 can also include: Block S110, which includes deploying an agent (either an identical agent or a distinct agent) on a second node in the target network; Block S180, which includes recording the security controls behaviors of the target network security tools in response to the agents at the single node and the second node in the target network; and Block S190, which includes presenting the security controls behaviors of the target network security tools.

1.1 Applications

Generally, a computer system can execute Blocks of the first method S100 to configure an autonomous software-based agent to execute a predetermined set of steps that mimic or implement a persistent, staged, and deterministic attack graph (e.g., attack trajectory) on a selected node within a target network. The computer system can also implement the agent on the selected node within the target network so that the agent executes its emulated malicious behavior on the selected node. The computer system can further observe and record the response of security controls in force at the selected node or more generally on the target network to determine whether the agent was detected or prevented from executing its malicious action(s). Further, the computer system can analyze, report, and display the performance of the security controls as measured against the agent so that security personnel can be advised of any limitations or vulnerabilities in their system security controls that need to be addressed. Additionally, the computer system can provide recommendations to adapt and improve the security controls against the agent, either on a node-specific or network-wide basis.

In particular, the computer system can configure the agent based upon attack profiles garnered from real-world attack tactics, techniques, and procedures (TTPs). The agent can therefore be configured to execute sophisticated, persistent, multi-stage, and multi-domain attacks against a node or nodes within a network and thus emulate a real attack from a real malicious actor. Rather than focusing on a particular presence or absence of a security vulnerability, the configured agent is representative of a set of simulated behaviors (e.g., TTPs) that in turn are analogous to real world behaviors exhibited by malicious actors.

The computer system can implement the agent at a node within the target network to demonstrate both the efficacy of the active security controls as well as the potential vulnerabilities of those security controls through a multi-staged attack. For example, an agent can be configured to execute multiple portions of a multi-stage simulated attack in concert. A common security control system might be optimized to detect a certain kind of behavior from the agent, and therefore detect a first malicious action while a second or third malicious action remains undetected. The agent can be configured to attempt various approaches into its desired position in the network and, like a malicious human actor, will not be defeated by one of those approaches being detected. In another example, the agent can be configured to behave as a persistent threat and lurk or remain idle on a node until such time as it executes a set of attacking steps against the node or the target network.

The computer system can further demonstrate any deficiencies in the security controls by analyzing, reporting, and displaying the relative performance of the security controls as measured against the agent, along with a diagnosis of vulnerabilities and recommendations for additional controls or remediating protocols that the network owner can implement to reduce any security risks. Moreover, the computer system can further maintain resilience of the security controls by repeatedly implementing the agent on the same node at different times, on different nodes at the same time, or on different nodes at different times, to measure the performance of the security controls as varied over time and nodes within the network.

Additionally, the computer system can configure the agent to continue along its attack plan even after its actions have been detected or prevented by the security controls. The computer system can provide additional insight by illustrating counterfactual events that might have happened but for the success of the security controls in detecting or preventing the agent behavior. For example, if an agent is detected by security controls at a node at the inception of its attack plan, the computer system can continue the emulated attack through subsequent steps to demonstrate how the security controls would have performed against the agent.

As described in more detail below, the system and method for emulating an attack on a node in a target network embody a technique-based approach that more accurately depicts the TTPs of known or suspected attacks, therefore providing network administrators with greater assurance that their networks can withstand real world attacks from similarly motivated malicious actors. Rather than emphasizing individual vulnerabilities within nodes or systemic vulnerabilities within networks, the system and method described herein provide a full-scope emulated attack with appropriate breadth of techniques and variation along timelines in accordance with techniques employed by real world malicious actors. In doing so, the system and method can provide network administrators with a greater sense of their holistic security posture vis-à-vis potential adversaries, rather than a discrete library of individual vulnerabilities at a node or on the network.

1.2 System

Figure 2:
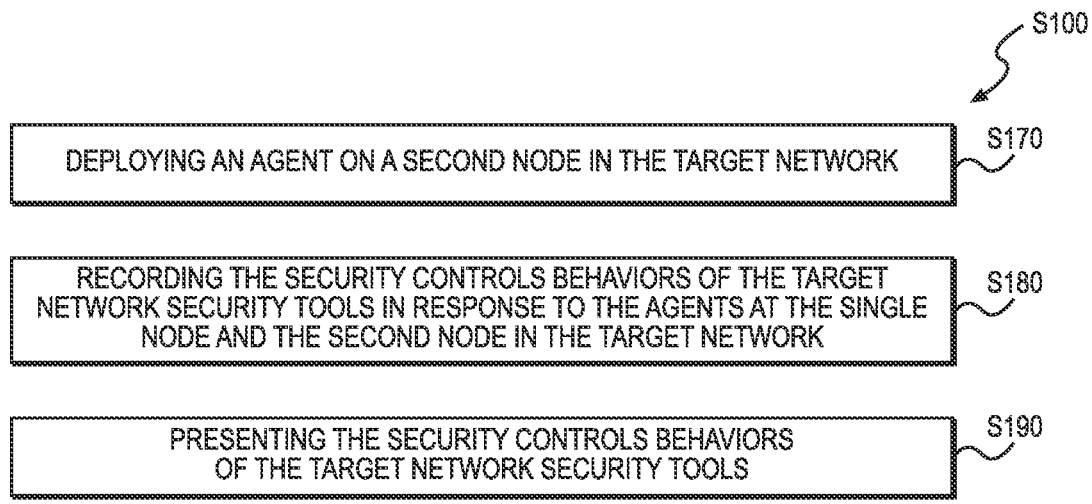
FIG. 2 is a flowchart representation of one variation of the first method.

As shown in FIG. 2, a computer system can interface with (or includes): a coordination service and a set of internal agents installed on assets (or "nodes") within the target network.

In one implementation, when the first method S100 is enabled on the target network, an administrator or other affiliate of the target network: installs an instance of a coordination service on a machine within the target network; and supplies login information or other credentials for security controls (e.g., direct and aggregate network threat management systems) installed or enabled across the target network or at particular assets or nodes within the target network. The coordination service can then: load plugins for these security controls; automatically enter login information or other credentials supplied by the administrator in order to gain access to event logs generated by these security controls responsive to activity detected on the target network; and retrieve current settings and configurations of these security controls within the target network, such as whether these security controls are active and whether active security controls are configured to detect, prevent, or alert on certain network activities or attacks on nodes or the network more generally.

1.3 Agent Configuration

As shown in the FIGURES, the system can execute Block S110 of the first method S100, which recites implementing an agent at an emulation engine to execute a deterministic attack flow including a series of steps. Generally, the agent is a software attack simulation that can include a file representation of a deterministic set of modeled malicious attacker techniques that can be interpreted and executed by the emulation engine at a predetermined level (e.g., the operating system level, kernel level, or user-account level) of a node within a target network.

In one implementation, the agent can be configured to execute a deterministic attack flow at the selected node, including incorporating known or expected attacker techniques that vary by type of target, point of vulnerability, timing, latency, and parallelism of executable steps at a single node (e.g., synchronously or quasi-synchronously performing more than one step in the attack flow at the selected node). In one implementation, the selected node can include an asset (e.g., an internal server, a printer, a desktop computer, a smartphone, a router, a network switch, an internet-connected sensor/detector/controller): within the target network; and loaded with the agent configured to disable, control, monitor, or otherwise disrupt the technique of the selected node according to the deterministic attack flow generated by the computer system.

In another implementation, the system can execute Block S110 of the first method S100 by configuring the agent according to a prior attack archetype, (e.g., known or surmised techniques used by malicious actors and of interest to an owner of the target network). The system can execute Block S110 of the first method S100 to configure the agent according to a specified set of software instructions that mimic, approximate, and emulate the desired techniques and techniques of interest in the prior attack archetype. For example, an attack archetype can involve acquiring an escalating set of permissions within an operating system of the node, dwelling at the node within the target network for a predetermined time interval with the set of permissions, and then exfiltrating sensitive data from the node using the acquired permissions at a subsequent time. In another example, an attack archetype can involve acquiring an escalating set of permissions within an operating system of the node and then encrypting data stored at the node using the acquired permissions (e.g., precursor to a ransomware attack). In an alternative implementation, the system can execute Block S110 of the first method S100 by configuring an agent based upon user input by a system administrator to test or refine specific security controls on the target network.

Generally, the system can execute Block S110 of the first method S100 to configure the agent to behave in a deterministic manner in operating autonomously at the node, including by simulating an attack on an operating system, kernel, or user account by seeking permissions, authentications, account credentials, passwords, data, encryption keys, and communications software, protocols, and ports. As noted above, the agent can be configured to conduct a series of steps in sequence or in parallel, such as attempting to access account credentials, passwords, or encryption keys while simultaneously inspecting communications ports for viable options to exfiltrate data. Alternatively, the agent can also be configured to execute actions at predetermined times to simulate longer-term, more patient attack techniques. In this alternative implementation, an agent can be configured to sit idle at a node, thus potentially remaining undetected by the security controls and mimicking real-world attacker techniques, until such time as the agent is instructed to begin or resume its attack against the node.

1.4 Deployment and Endpoint Selection

As shown in FIG. 1, the system can execute Block S120 of the first method S100 by deploying the agent on a single node in the target network. Generally, the node can be selected by an implementer (e.g., network administrator) of the system and method and can include any device connected to the target network. An example node can include an endpoint device that is internet connected to other devices via a TCP/IP or other internet protocol. Examples of endpoint devices include desktop or laptop computers, smart phones, tablets, printers, point of sale terminals, automated kiosks, and internet-connected smart devices such as appliances, home security systems, and automobiles.

Generally, the system can execute Block S120 of the first method S100 by deploying the agent on a node selected by an owner or administrator of the target network. Upon node selection, the system can install or deploy the agent on the selected node. In one variation of the example implementation, the system can provide recommendations for node selection based upon: a statistical analysis of target network vulnerabilities indicating a highest probability point of attack; a topological analysis of the target network indicating a highest probability point of attack; a correlation between the target network topology and currently understood trends in adversary TTPs indicating a highest probability point of attack; or an analysis of currently understood TTPs indicating a highest probability point of attack.

As noted above, in another example implementation of the system and method, an agent or agents can be deployed onto multiple nodes within a network synchronously, in which case the options for node selection can be repeated and optimized for an emulated multi-node attack on the target network. In an emulated multi-node attack, the system can provide node selection recommendations based upon: a statistical analysis of target network vulnerabilities indicating highest probability points of attack; a topological analysis of the target network indicating highest probability points of attack; a correlation between the target network topology and currently understood trends in adversary TTPs indicating highest probability points of attack; or an analysis of currently understood TTPs indicating highest probability points of attack.

1.5 Executing Attack Techniques

As shown in the FIGURES, the system can execute Block S130 of the first method S100 by executing the emulated attack on a single node in the target network, for example by running the agent simulated attack software at the single node. Generally, the agent can be configured to automatically begin its attack techniques once deployed on the single node. As the agent is internally and safely deployed on the single node in the target network, the agent does not generally need to include instructions or techniques for initial access into the network.

Generally, an example emulated attack can include the agent executing software instructions implementing techniques to establish a persistent presence on the target network at the single node by hiding, obfuscating, or covering artifacts of its presence; techniques for privilege escalation; techniques for security controls evasion; techniques for credential access; techniques to discover accounts and accesses on the target network; techniques to make preparations to move laterally within the target network; techniques for collecting data at the single node; techniques for asserting command and control over the single node; techniques for preparing to exfiltrate data from the single node; and techniques for impacting or disrupting the single node (e.g., data encryption or resource hijacking). As noted above, the system can configure each agent to include a customized set of techniques described above, generally based upon real-world attack profiles. Therefore, the system can configure each agent to include any combination or sub-combination of the noted techniques best suited for testing and validating the security controls of the target network and the single node.

Generally, the agent can execute its instructions unless and until it is detected by the security controls and prevented from further action by the security controls. For example, the agent can follow an attack path including: (1) establishing persistence, (2) escalating privileges, (3) asserting command and control, and then (4) impacting the single node by hijacking its capabilities. Therefore, if the agent is able to execute steps (1)-(4) above without detection or prevention, then the agent can, in a simulated fashion, hijack the single node and complete its attack path. If, on the other hand, the security controls detect and prevent the agent from further execution at steps (1)-(3) above, then the node will not be hijacked by the emulated attacker and the agent will terminate its attack (e.g., a successful security control intervention).

As noted above, in another variation of the example implementation, the system can configure the agent to proceed along its attack path even if it has been detected or prevented from further action by the security controls. In this example implementation, even if the agent is detected and prevented at step (3) of the example attack, the agent will still proceed to step (4) (hijacking the single node) in order to demonstrate the progressive threat that the agent can pose through each step of its attack path. Therefore, even if the agent is detected at step (1) (establishing persistence), the agent can continue through its attack path to demonstrate what might have occurred but for its early detection and prevention.

1.6 Recording Control Techniques

As shown in the FIGURES, the system can execute Blocks of the first method S100 by recording the security control behaviors of the target network security controls in response to the agent at the single node in Block S140. Generally, the system (e.g., via the coordination service) can record logs of actions or techniques employed by both the agent and the security controls at the single node. In one example implementation, the system can export or transfer the collected log into a report that details each action or technique employed by the agent and each action or technique employed by the security controls in response to the agent.

In a variation of the example implementation, the system can execute Block S130 of the first method S100 by generating a report of agent and security controls techniques. An example report can include agent techniques (e.g., establishing persistence, escalating privileges, preparing for lateral movement, preparing for exfiltration) as well as security control techniques (agent detection, agent prevention, agent tracking, agent continuation). In another variation, the report can include time stamps associated with each action taken by the agent and security controls.

For example, if the security controls are able to detect and prevent the agent as it is escalating privileges, then the report can indicate the resulting actions as well as times at which the agent was detected and prevented at the single node. Additionally, as noted above, if the agent is configured to continue its simulated attack even after detection and prevention, then the system can generate the report to indicate that the agent was detected at a first time, prevented at a second time, and continued along its attack path with associated subsequent times for its subsequent techniques employed at the single node.

1.7 Presenting the Control Techniques

As shown in the FIGURES, the system can execute Blocks of the first method S100 by presenting or displaying the report of the security controls techniques in response to the agent. In one example implementation, the system can present or display the report on a display of the computer system through the coordination service. Alternatively, the system can store the presentable and displayable report on a system server for remote or later access by computing devices associated with the system, (e.g., mobile devices, desktop computers, or laptop computers networked with the system) with appropriate credentials for viewing the report.

In one variation of the example implementation, the system can present or display the report in a visually understandable format, such as for example as a heat map or network diagram that is more easily understood by a human reader. Generally, the system can present or display the report by ingesting a network diagram or topology of the target network as well as a node diagram of the single node. For example, a node diagram can illustrate various layers of access, control, data, encryption, network or communication ports, etc. that the configured agent may be attempting to access or exploit.

In one example implementation, the system can execute Block S150 of the first method S100 to present a heat map of the attack that includes color coded indicia of aspects of the attack and the security controls response. For example, the heat map can display a security controls set of colors including: a first color corresponding to agent detection, a second color corresponding to agent prevention, a third color corresponding to agent continuation, and overlayed time stamps indicating the time at which each security controls event took place. Similarly, the heat map can display an agent set of colors including: a first color corresponding to a first technique (e.g., establishing persistence), a second color corresponding to a second technique (e.g., permission escalation), etc., along with overlayed time stamps indicating the time at which each agent event took place.

In another variation of the example implementation, the system can execute Block S130 of the first method S100 by presenting or displaying a color-coded progression of the attack (e.g., red=bad; green=good) throughout the entire course of the attack configured for the agent. For example, if the agent is configured to engage in a seven-step attack, then the system can present or display a seven-stage diagram detailing each technique employed by the agent (whether or not the agent was successful at all of the stages). Moreover, the system can present or display at which step, within the example seven-step attack, the attack was eventually detected or prevented and how far the agent proceeded along its prescribed attack path before the security controls were able to detect or prevent it from further action.

Additionally, in instances in which the agent is configured to continue post-detection or post-prevention, the system can present or display additional agent techniques and security controls responses. For example, if the agent continues after it was detected at step (3) and prevented at step (4), then the system can present or display that the agent was detected again at step (6) and not detected or prevented at either step (5) or step (7). In this variation of the example implementation, the system can present or display counterfactual information from which a network administrator can gain valuable insight about the resilience of the target network, including identifying potential vulnerabilities or gaps in the security controls that might be exploitable by another agent or an actual malicious actor.

In another variation of the example embodiment, the system can execute Block S130 of the first method S100 by displaying recommendations or suggestions for improvements in security controls in response to the performance of the security controls against the agent. For example, if an agent is easily capable of preparing data for exfiltration at the single node, then the system can display recommendations for substitute security controls, additional security controls, or adaptations or tuning of existing security controls to more readily detect when data files are being gathered and prepared for exfiltration. Likewise, if an agent is easily capable of escalating its privileges at the single node, then the system can display recommendations for improvements in authentication processes, passcode generation, or passcode protection.

1.8 Variations

As noted above, variations of the system and method can incorporate example implementations in which a single agent or multiple agents are deployed and executed synchronously on multiple nodes in the target network.

Another variation of the system and method can include automatically generating and configuring the agent or agents based upon target network topography and a library of agent-based techniques.

1.8.1 Networks of Nodes

In one variation of the example implementation, the computer system can execute Block S170 of the first method S100 to implement a single agent or a set of agents on a set of nodes within the target network to emulate network-based threats relating to the command and control of communications protocols and the hopping or transition of an agent from one node in a network to another, usually more privileged or elevated, node in the same network. For example, a pair of agents can be implemented on a pair of nodes within the target network and configured to operate as though a single malicious actor has successfully hopped from a first node (e.g., an edge node) to a more valuable node (e.g., a systems administrator node) within the same target network. As noted above, the computer system can configure the agent(s) to execute the emulated malicious acts in a persistent and time-dependent manner such that detection and prevention must also be persistent and timely.

In this variation of the example implementation, the system can configure an agent or agents with predetermined path parameters that instruct the agent or agents when to move from node to node within the target network as well as between which nodes within the target network to move. Therefore, the agent or agents will be simulating an attack against both node-centric security controls but also network-wide security controls. Furthermore, techniques that were limited to a preparation phase in a single node implementation, (e.g., preparing to hop between nodes and preparing to exfiltrate data), can be executed in full in a multi-agent or multi-node implementation.

As noted above, the system can configure the agent or agents to continue execution of the attack techniques even after detection or prevention to better demonstrate any potential limitations in the multi-actor, multi-node attack simulation.

In this variation of the example implementation, the system can execute Block S180 of the first method S100, which includes recording the security controls behaviors of the target network security tools in response to the agents at the set of nodes in the target network. Generally, the system (e.g., via the coordination service) can record logs of actions or techniques employed by both the agents, the network-wide security controls, and the security controls at the nodes. In one example implementation, the system can export or transfer the collected log into a report that details each action or technique employed by the agents and each action or technique employed by the respective security controls in response to the agents.

Generally, the system can execute Block S170 of the first method S100 by generating a report of agents and security controls techniques. An example report can include techniques for each of the agents (e.g., establishing persistence, escalating privileges, preparing for lateral movement, preparing for exfiltration) as well as network-wide and node-based security control techniques (agent detection, agent prevention, agent tracking, agent continuation, netflow, network traffic). Additionally, the report can include time stamps associated with each action taken by the agents and respective security controls.

In this variation of the example implementation, the system can execute Block S190, which includes presenting the security controls behaviors of the target network security controls. As noted above, the system can present or display the report in a visually understandable format, such as for example as a heat map or network diagram that is more easily understood by a human reader. Generally, the system can present or display the report by ingesting a network diagram or topology of the target network as well as node diagrams of the each of the nodes involved in the simulated attack. For example, the network diagram can include a network topology as well as typical, expected, or baseline network behaviors between nodes (e.g., baseline netflow or network traffic between selected nodes). Additionally, the node diagrams can illustrate various layers of access, control, data, encryption, network or communication ports, etc. that the configured agent may be attempting to access or exploit.

1.8.2 Automation of Agent Configuration

In another variation of the example implementation, the system can execute Block S110 by automatically configuring an agent or agents based upon a characterization of the target network (e.g., network topology, types of nodes, types of security controls) and a set of agent techniques derived from applicable real-world attack scenarios. As noted above, agent techniques can include: techniques to establish a persistent presence on the target network at the single node by hiding, obfuscating, or covering artifacts of its presence; techniques for privilege escalation; techniques for security controls evasion; techniques for credential access; techniques to discover accounts and accesses on the target network; techniques to make preparations to move laterally within the target network; techniques for collecting data at the single node; techniques for asserting command and control over the single node; techniques for preparing to exfiltrate data from the single node; and techniques for impacting or disrupting the single node (e.g., data encryption or resource hijacking).

Therefore, in this variation of the example implementation, the system can automatically configure the agent or agents (e.g., a set of software instructions to emulate a set of attacking techniques) to optimally demonstrate any vulnerabilities or gaps in the security controls of the target network. In one alternative implementation, the system can automatically configure the agent or agents based upon a network characterization (e.g., types of nodes) and a listing or digest of techniques that are most commonly or successfully used against the types of nodes. In another alternative implementation, the system can automatically configure the agent or agents based upon a network topology and a list or digest of techniques that are most commonly or successfully used against that type of network topology or networks having an analogous topology.

In another alternative implementation, the system can automatically configure the agent or agents based upon an entity vulnerability profile and a listing or digest of techniques that are most commonly or successfully used against entities having similar vulnerability profiles. For example, an entity vulnerability profile can include an assessment of what types of information or resources are available on the target network and therefore providing motivation for malicious actors to attack the target network. For example, does the target network include or host: industrial financial data, personal financial data, personal health or sensitive data, technological data, or industrial control systems. Therefore, based upon the likely target (e.g., industrial control systems) and the network topology, the system can automatically configure the agent or agents to emulate a likely attack (based upon real world models) that can effectively test the security controls deployed on the target network and its nodes.

Generally, the system can automatically configure the agent or agents using topological analysis, cluster analysis, regression analysis, or by employing game theoretic principles to implement and configure optimized agent techniques for the target network.

2. Second Method

Figure 4:
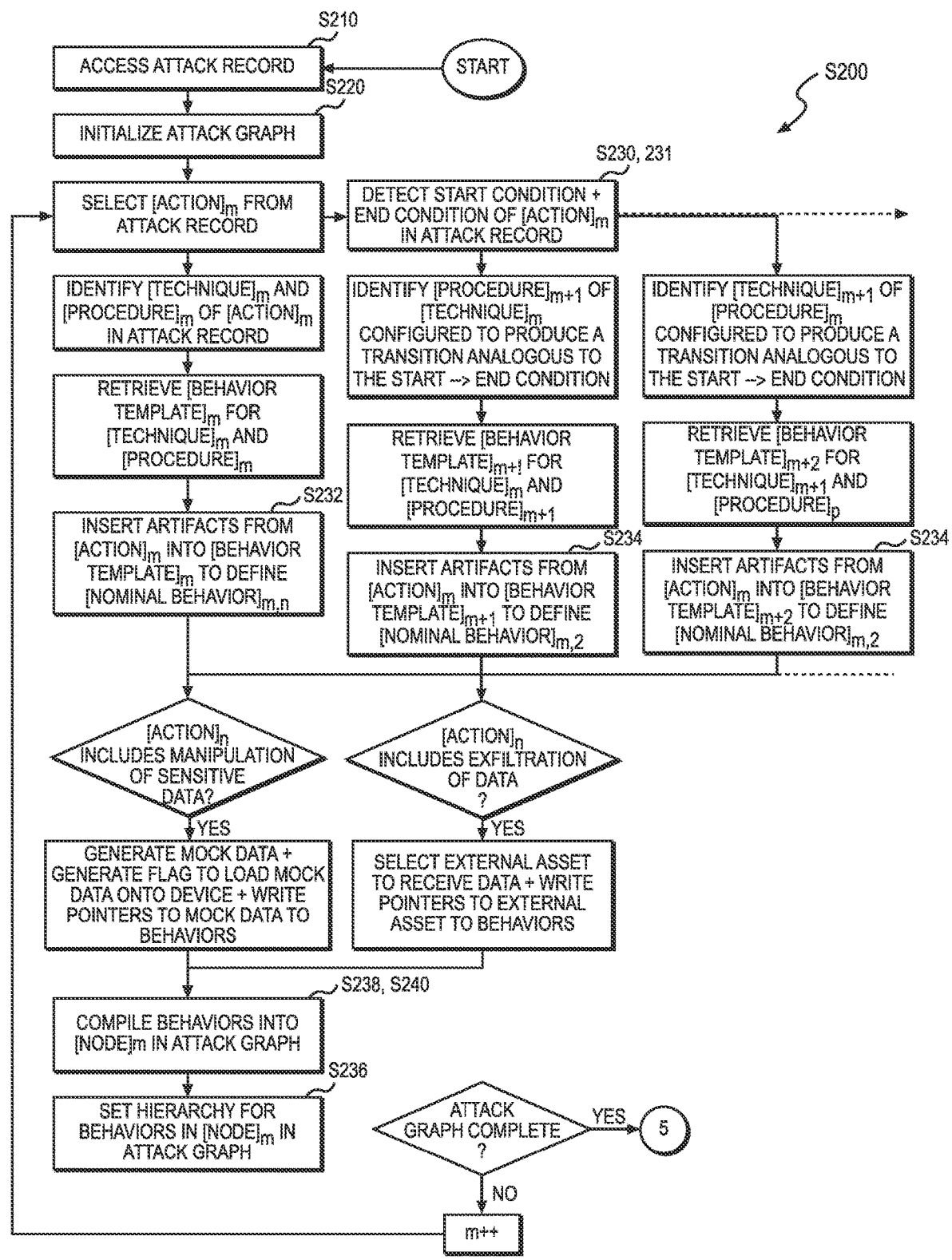
FIG. 4 is a flowchart representation of a second method.
Figure 5:
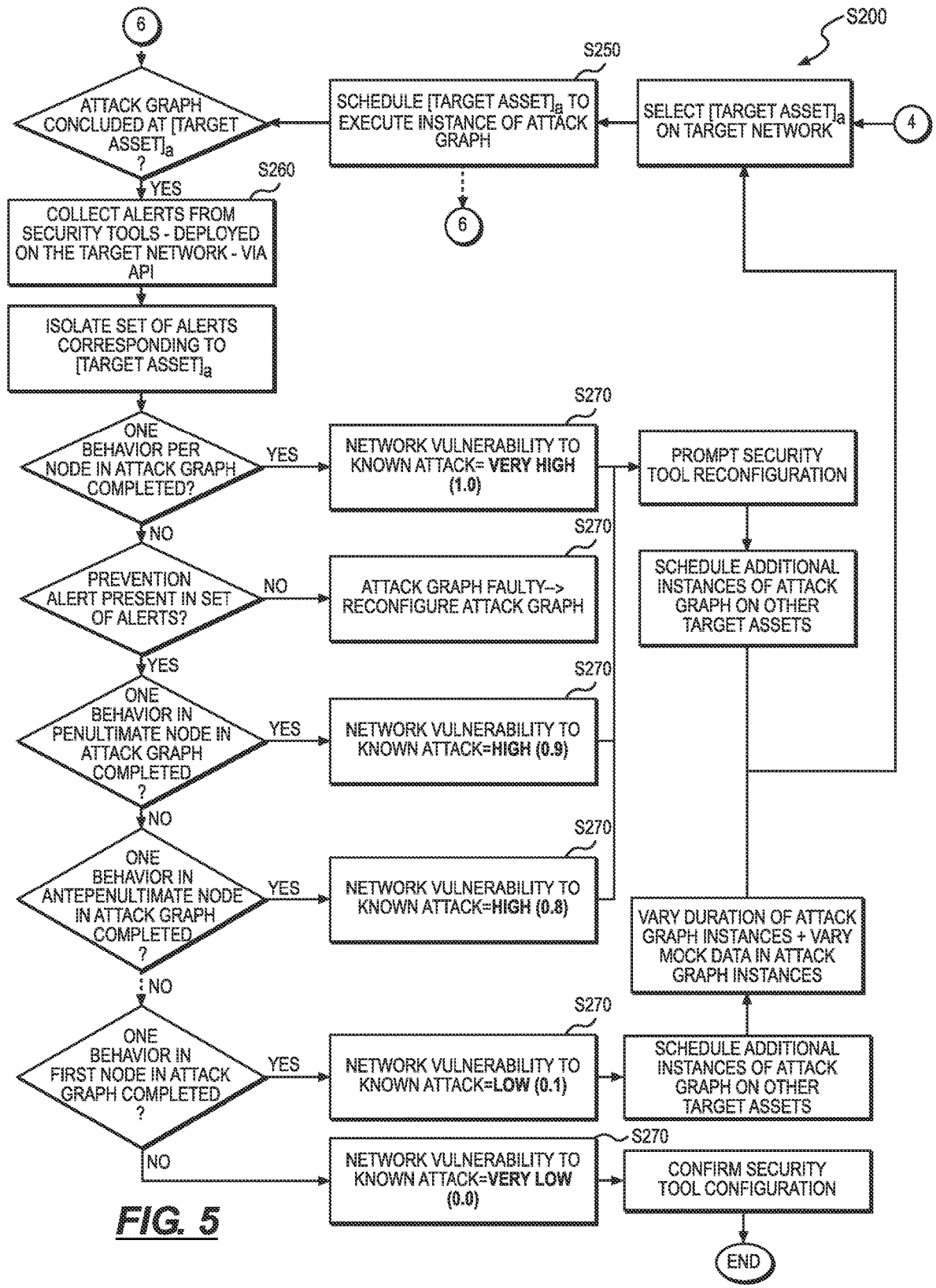
FIG. 5 is a flowchart representation of one variation of the second method.
Figure 6:
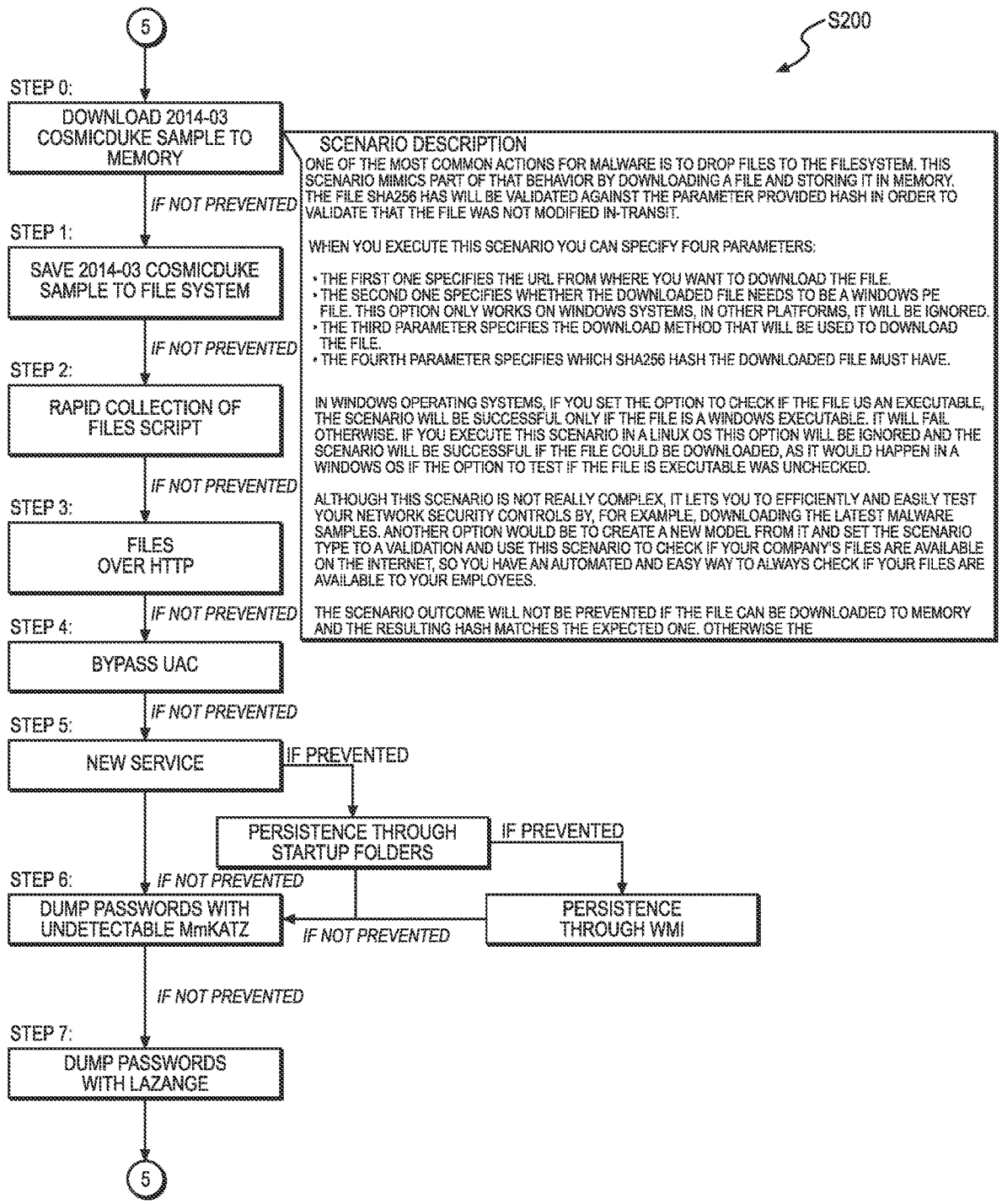
FIG. 6 is a flowchart representation of one variation of the second method.

As shown in FIGS. 4-6, a second method S200 for emulating a known attack on a computer network includes: accessing an attack record defining a sequence of actions executed on a machine on a second computer network and representing a known attack on the second computer network in Block S210; and initializing an attack graph comprising a set of nodes in Block S220. The second method S200 also includes, for each action in the sequence of actions: based on the attack record, deriving a start condition at the machine prior to start of the action in Block S230; based on the attack record, deriving an end condition at the machine following completion of the action in Block S231; based on the attack record, defining a nominal behavior in Block S232 representing the action executed by the machine during the known attack and executable by a target asset on a target network to emulate the action; defining a set of alternative behaviors in Block S234 analogous to the nominal behavior and executable by the target asset to emulate a transition from the start condition to the end condition at the target asset; defining a target hierarchy for the nominal behavior and the set of alternative behaviors in Block S236; and storing the nominal behavior and the set of alternative behaviors according to the target hierarchy in a node in the set of nodes in the attack graph in Block S238. The second method S200 further includes: linking the set of nodes in the attack graph according to the sequence of actions representing the known attack in the attack record in Block S240; scheduling the target asset on the target network to selectively execute nominal behaviors and alternative behaviors, according to target hierarchies, stored in the set of nodes in the attack graph during a first time period in Block S250; accessing a set of alerts generated by a set of security tools, deployed on the target network, during the first time period in Block S260; and characterizing a vulnerability of the target network in Block S270 based on presence of alerts, in the set of alerts, indicating detection and prevention of nominal behaviors and alternative behaviors, stored in nodes in the attack graph, executed by the target asset during the first time period.

Figure 3:
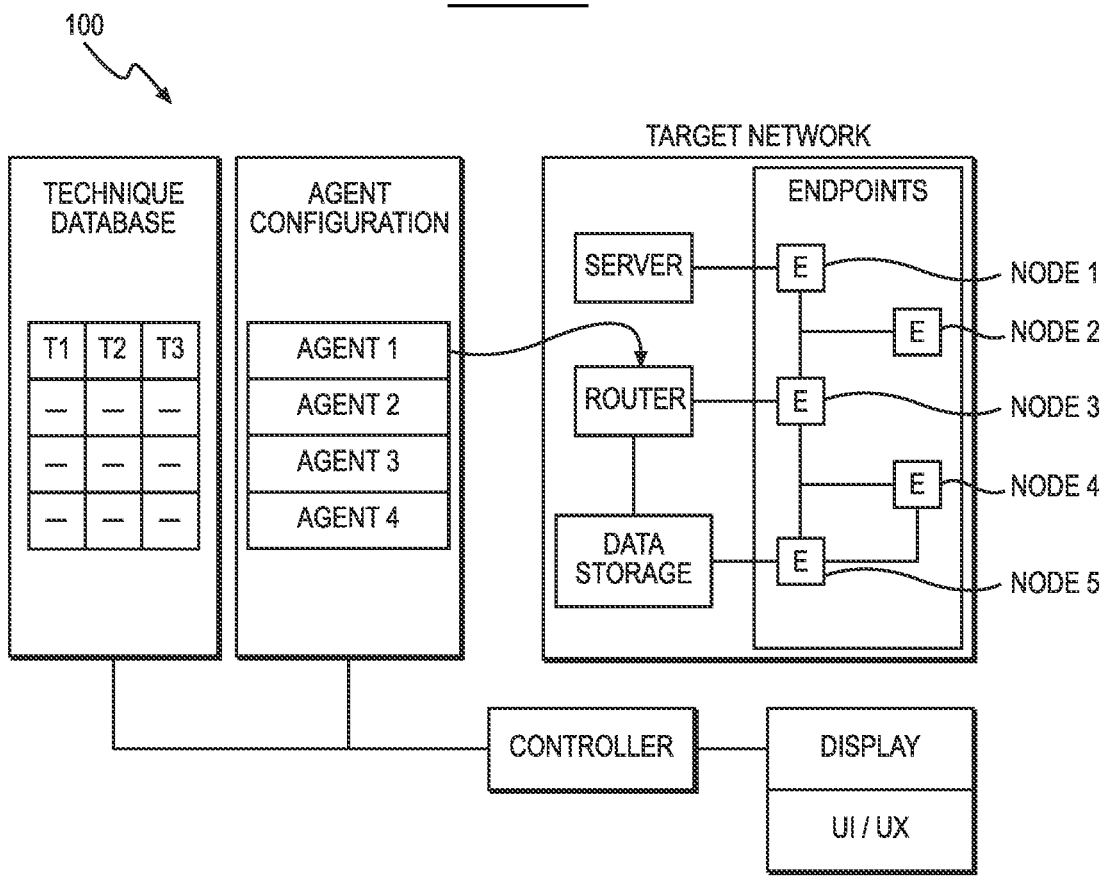
FIG. 3 is a schematic representation of a first system.

One variation of the second method S200 shown in FIG. 3 includes: accessing an attack record defining a sequence of actions executed on a machine on a second computer network and representing a known attack on the second computer network in Block S210; and initializing an attack graph comprising a set of nodes in Block S220. This variation of the second method S200 also includes, for each action in the sequence of actions: based on the attack record, defining a nominal behavior in Block S232 representing the action executed by the machine during the known attack and executable by a target asset to emulate the action; defining a set of alternative behaviors in Block S234 analogous to the nominal behavior and executable by the target asset to emulate an effect of the action at the machine on the second computer network; and storing the nominal behavior and the set of alternative behaviors in a node in the set of nodes in the attack graph, the node corresponding to the action in Block S238. This variation of the second method S200 further includes: connecting nodes in the attack graph according to an order of actions in the sequence of actions representing the known attack in Block S240; scheduling a first asset on a target network to selectively execute nominal behaviors and alternative behaviors stored in the set of nodes in the attack graph during a first time period in Block S250; scheduling a second asset on the target network to selectively execute nominal behaviors and alternative behaviors stored in the set of nodes in the attack graph during the first time period in Block S250; accessing a set of alerts generated by a set of security tools, deployed on the target network, during the first time period in Block S260; and characterizing a vulnerability of the target network during the first time period based on presence of alerts, in the set of alerts, indicating detection and prevention of nominal behaviors and alternative behaviors executed by the first asset and the second asset according to the attack graph in Block S270.

A similar variation of the second method S200 includes: accessing an attack record defining a sequence of actions executed on a machine on a second computer network and representing a known attack on the second computer network in Block S210; and initializing an attack graph comprising a set of nodes in Block S220. This variation of the second method S200 also includes, for each action in the sequence of actions: based on the attack record, defining a set of behaviors in Block S232 analogous to the action and executable by a target asset on a target network to emulate an effect of the action at the machine on the second computer network; and storing the set of behaviors in a node in the set of nodes in the attack graph, the node corresponding to the action in Block S238. This variation of the second method S200 further includes: connecting nodes in the attack graph according to an order of actions in the sequence of actions representing the known attack in Block S240; scheduling a first asset on a target network to selectively execute analogous behaviors stored in the set of nodes in the attack graph during a first time period in Block S250; scheduling a second asset on the target network to selectively execute analogous behaviors stored in the set of nodes in the attack graph during the first time period in Block S250; accessing a set of alerts generated by a set of security tools, deployed on the target network, during the first time period in Block S260; and characterizing a vulnerability of the target network during the first time period based on presence of alerts, in the set of alerts, indicating detection and prevention of analogous behaviors executed by the first asset and the second asset according to the attack graph in Block S270.

2.1 Applications

Generally, a computer system can execute Blocks of the second method S200: to access an attack record defining a sequence of actions performed by a machine on a second network during a previous attack on the second network; to define a sequence of nominal behaviors executable by a target asset on a target network to emulate the known attack; to define additional behaviors analogous to these nominal behaviors (i.e., behaviors that yield similar transitions between start and end conditions or yield similar effects at the target asset when executed by the target asset); to compile these nominal and analogous behaviors into a multi-nodal attack graph (e.g., in the form of a decision tree); and to schedule selective execution of the nominal and analogous behaviors in the attack graph by the target asset.

The target asset can then: serially attempt to complete each nominal and analogous behavior in a first node in the attack graph until the target asset successfully completes one of these first behaviors; serially attempt to complete each nominal and analogous behavior in a second node in the attack graph until the target asset successfully completes one of these second behaviors; and repeat the process until the target asset fails to complete any behavior in a node of the attack graph or until the target asset completes a behavior in the final node of the attack graph, shown in FIG. 6. More specifically, the target asset can selectively and sequentially execute behaviors in the attack graph in order to emulate the known attack occurring at the target asset on the target network. Because the computer system combines both a nominal behavior according to a stage of the known attack and analogous behaviors in nodes of the attack graph, the target asset can: sequentially attempt multiple analogous behaviors until the target asset achieves a target result at each node of the attack graph, which correspond to stages of the known attack; and thus emulate actions of an authentic attacker making multiple attempts to exploit the target asset.

Concurrently, security tools deployed on the network may detect or prevent these attempted behaviors by the target asset and generate alerts accordingly. The computer system can therefore also: monitor alerts generated by a suite of security tools deployed on the target network during execution of the attack graph by the target asset; isolate a set of alerts associated with the target asset (e.g., specifying an IP or MAC address of the target asset); and characterize a vulnerability of the target network to the known attack based on the types and scope of this set of alerts. More specifically, the computer system can identify the target network as: very vulnerable to the known attack if this set of alerts excludes prevention alerts and if the target asset completed the attack graph; moderately vulnerable to the known attack if this set of alerts includes some prevention alerts for behaviors in the attack graph and if the target asset completed the attack graph; minimally vulnerable to the known attack if this set of alerts includes detection prevention alerts for behaviors late in the attack graph and if the target asset failed to complete the attack graph; and not vulnerable to the known attack if this set of alerts includes detection prevention alerts for behaviors early in the attack graph and if the target asset failed to complete the attack graph.

Therefore, the computer system can: define and compile multiple nominal and analogous behaviors that represent stages of a known attack into a multi-nodal attack graph executable by the target asset to emulate actions of an authentic attacker attempting to exploit the target asset; schedule the target asset on the target network to autonomously execute the attack graph and attempt behaviors defined in the attack graph during a target time period; aggregate alerts generated by security tools deployed on the network during the target time period; and characterize vulnerability of the target network to attacks analogous to the known attack based on detection and prevention alerts published by these security technologies and based on whether the target asset successfully completed the attack graph.

Furthermore, the computer system can schedule and/or coordinate execution of the attack graph by multiple target assets, such as concurrently or over time, to detect vulnerabilities in different locations and at different endpoint devices throughout the target network. More specifically, by generating one attack graph containing multiple options for nominal and analogous behavior representing the known attack: the computer system can deploy a single attack graph to multiple (e.g., many) target assets on the target network; and each of these target assets can attempt multiple behaviors in each node of the attack graph and emulate actions of an authentic attacker, but achieve different combinations of successful behaviors responsive to different behavior preventions resulting from different security tool configurations across the target network. The computer system can thus characterize different vulnerabilities to the known attack across the target network based on this single attack graph executing on multiple target assets on the target network.

Therefore, the second method S200 can be executed by a computer system, a coordination service, and/or a set of internal agents installed on target assets within the target network to emulate—in a real (i.e., not virtual) network environment on the target network—a previous command-and-control attack or a previous data-leak on another, different network.

2.2 Terms

A "second network" is referred to herein as a computer network that was previously subject to a previous attack, such as a command-and-control or data-leak attack.

A "machine" is referred to herein as a computing device—such as a server, a router, a printer, a desktop computer, or a smartphone—within or connected to the second network and that was involved in the previous attack.

An "attack record" is referred to herein as a data file, investigation report, or other description of techniques, procedures, and artifacts of actions performed at a machine during the previous attack. For example, an application programming interface installed on or interfacing with the second network can capture packet fragments transmitted between machines internal and external to the second network and related metadata during the previous attack. The application programming interface can also capture metadata representative of these packet fragments, such as including: transmit times (or "timestamps"); source machine identifiers (e.g., IP or MAC addresses); destination machine identifiers; protocols (e.g., TCP, HTTP); packet payloads (or "lengths"); source and destination ports; request types (e.g., file requests, connection initiation and termination requests); and/or request response types (e.g., requests confirmed, requests denied, files sent). A security analyst or computer system can then: filter these packet fragments to remove packet fragments not related (or unlikely to be related) to the previous attack; interpret a sequence of actions executed by a machine during the previous attack based on the remaining packet fragments and metadata; and derive techniques, procedures, and artifacts of these actions from these packet fragments and metadata.

A "target network" is referred to herein as a computer network on which the previous attack is emulated by a target asset attempting behaviors prescribed in nodes of an attack graph—according to Blocks of the second method S200—in order to detect vulnerabilities to the previous attack on the target network and thus verify that security technologies deployed on the target network are configured to respond to (e.g., detect, prevent, or alert on) analogous attacks.

An "asset" is referred to herein as a computing device—such as a server, a router, a printer, a desktop computer, a smartphone, or other endpoint device—within or connected to the target network.

An "internal agent" is referred to herein as an asset—within the target network—loaded with attack emulation software and thus configured to execute steps of attack emulations on the target network. Similarly, an "external agent" is referred to herein as an asset—external to the target network (e.g., a remote server)—loaded with attack emulation software and thus configured to execute steps of attack emulations on the target network.

An "attack emulation" is described herein as attempted execution of an attack graph by an internal agent executing on a target asset on the target network to emulate the previous attack—that previously occurred on the second network—on the target network.

2.3 System

As shown in FIG. 3, the computer system can interface with (or includes): a coordination service; a set of internal agents installed on assets (or "machines") within the target network; and an external agent(s) installed on an asset outside of the target network.

2.3.1 Coordination Service

In one implementation, when the second method S200 is enabled on the target network, an administrator or other affiliate of the target network: installs an instance of a coordination service on a machine within the target network; and supplies login information or other credentials for security technologies (e.g., direct and aggregate network threat management systems) installed or enabled across the target network or at particular assets within the target network. The coordination service can then: load plugins for these security technologies; automatically enter login information or other credentials supplied by the administrator in order to gain access to event logs generated by these security technologies responsive to activity detected on the target network; and retrieve current settings and configurations of these security technologies within the target network, such as whether these security technologies are active and whether active security technologies are configured to detect, prevent, or alert on certain network activities or attacks more generally.

Later, the coordination service can execute Blocks of the second method S200 to define, configure, schedule, and then coordinate emulation actions within the attack emulation on the target network.

2.3.2 Target Asset and Internal Agent

The computer system also schedules execution of attack graphs by internal agents deployed on target assets within the target network.

In one implementation, an internal agent is installed on an asset (e.g., an internal server, a printer, a desktop computer, a smartphone, a router, a network switch): within the target network; and loaded with an attack emulation software configured to send and receive data packets according to emulation actions within an attack emulation generated by the computer system.

In particular, an internal agent can: load an attack graph; select a first node in the attack graph; select a first (e.g., highest-ranking) behavior in the first node; attempt completion of the first behavior; and transition to a second node in the attack graph responsive to successful completion of the first behavior or select and repeat this process for a second behavior in the attack graph. The internal agent can then repeat this process for subsequent nodes of the attack graph until: the internal agent fails to complete all behaviors within one node; or completes a behavior in the last node in the attack graph to complete the attack graph.

2.3.3 External Agent

Similarly, the computer system can coordinate external agents outside of the target network to receive data (e.g., non-sensitive, mock data analogous to data lost during the previous attack on the second network) from the target asset during execution of the attack graph by the target asset.

In one implementation, an external agent includes an asset (e.g., an external server): outside of the target network; loaded with the attack emulation software; and configured to emulate a malicious external actor during a network attack.

2.4 Attack Record

Block S210 of the second method S200 recites accessing an attack record defining a sequence of actions executed on a machine on a second computer network and representing a known attack on the second computer network. Generally, in Block S210, the computer system can access an attack record generated in real-time during an attack and/or post hoc during an investigation of the attack on the second network.

In one implementation, the attack record is generated according to full packet capture (or "FPC") techniques executing on the second network during the attack. Thus, in this implementation, the computer system can access an attack record that includes a population of packet fragments that represent packet interchanges between hosts (e.g., "machines") within and external to the second network during the previous attack on the second network at an earlier time.

For example, an attack on the second network may generate network traffic between machines inside of the second network and a machine outside of the second network (e.g., a malicious external actor). An attack record generated during this attack may thus contain actual packet fragments transmitted between these internal machines and the external machine during the attack. The attack record may also contain metadata representative of each packet fragment, such as including: a transmit time (or "timestamp"); a source machine identifier (e.g., an IP or MAC address); a destination machine identifier (e.g., an IP or MAC address); a protocol (e.g., TCP, HTTP); a packet payload (or "length"); source and destination ports; a request type (e.g., file requests, connection initiation and termination requests); and/or a request response type (e.g., request confirmed, request denied, file sent).

Thus, in this implementation, the attack record may include a set of packet fragments that together represent a single data packet—sent from a source machine to a destination machine during the attack on the second network—containing a command, a request, or a file. The payload (i.e., the size, the length) of an individual packet fragment represented in the attack record may be a function of real-time network traffic, network bandwidth, and/or network configuration, etc. at the second network when the corresponding source machine transmitted the packet fragment to a corresponding destination machine. Therefore, transmission of this data packet within, to, or out of the second network at a particular time during the attack may be unique to the second network at this particular time.

Additionally or alternatively, after the attack is detected on the second network and characterized, such as by an external security technology, the computer system (or a supplier of the attack record) can: estimate a time period of the attack on the second network; access a global attack record representing traffic on the second network over time; extract a subset of packet fragments associated with timestamps that intersect the time period of the attack; filter this subset of packet fragments by source and destination machines that were and/or that may have been involved in the attack; and aggregate these packet fragments and related metadata in an attack record for the attack. The computer system can then retrieve this attack record in Block S210.

Additionally or alternatively, after the attack is detected on the second network and characterized, such as by an external security technology, the computer system (or a supplier of the attack record) can: investigate actions performed by a particular machine on the second network as part of the attack, such as both failure and successful actions performed by the particular machine under the control of a remote attacker; characterize the techniques, procedures, and artifacts of these actions; and store the techniques, procedures, and artifacts of these actions in an attack record of the attack.

For example, the computer system (or a supplier of the attack record) can categorize command and control techniques of an action by the particular machine during the attack on the second network as one of: an application layer protocol; communication through removable media; data encoding, data obfuscation; data resolution; an encrypted channel; a fallback channel; an ingress tool transfer; a multi-state channel; a non-application layer protocol; protocol tunneling; a proxy; remote access software; traffic signaling; and a web service; etc. In this example, the computer system (or a supplier of the attack record) can similarly categorize lateral movement techniques of an action by the particular machine during the attack on the second network as one of: exploitation of remote services; internal spearphishing; lateral tool transfer; remote service session hijacking; relocation through removable media; and use of alternate authentication material; etc. In this example, the computer system (or a supplier of the attack record) can further categorize a procedure of a remote service session hijacking lateral movement technique of an action by the particular machine during the attack on the second network as one of a SSH hijacking, RDU hijacking, remote desktop protocol, an SMW administrator share, or a distributed component object model procedure. Similarly, in this example, the computer system (or a supplier of the attack record) can further categorize a procedure of an alternate authentication material lateral movement technique of an action by the particular machine during the attack on the second network as one of a pass the hash, pass the ticket, application access token, and web session cookie procedure.

Furthermore, the computer system (or a supplier of the attack record) can derive and store artifacts of each action in the attack record, such as including: duration of the action; success of the action; quantity of attempts of the action; user or authentication credentials carried forward from a successful previous action of the attack; and port states and state changes during the action; etc.

Therefore, the attack record can include threat intelligence for a known attack on the second network, including a sequence of actions—defined by techniques, behaviors, and artifacts—executed by the machine as part of the attack.

However, the computer system can generate or access the attack record in any other way and containing attack data in any other format.

2.5 Attack Graph Construction

Once the computer system accesses the attack record representing actions by the machine during the previous attack, the computer system can: initialize an attack graph including a set of nodes in Block S220; and populate each node in the attack graph with a set of behaviors that replicate and/or are analogous (e.g., in result) to actions executed on the machine on the second network during the previous known attack, as shown in FIG. 4.

2.5.1 Alternate Behaviors

In one implementation, for a first action in the sequence of actions that represent the known attack, the computer system can: derive a start condition at the machine prior to start of the first action based on the attack record; derive an end condition at the machine following completion of the first action based on the attack record; and define a first nominal behavior representing the first action executed by the machine during the known attack and executable by a target asset on the target network to emulate the first action. For the first action, the computer system can also define a set of alternative (or "analogous") behaviors: analogous to the nominal behavior; and executable by the target asset to emulate a transition from the start condition to the end condition at the target asset. The computer system can further: define a target hierarchy for the nominal behavior and the set of alternative behaviors; and store the nominal behavior and the set of alternative behaviors according to the target hierarchy in a first node in the attack graph.

In one implementation, the computer system: extracts a first technique and first procedure of the first action from the attack record; retrieves a stored, predefined behavior template for this first technique and first procedure; populates this predefined behavior template with artifacts and other characteristics of the first action extracted from the attack record to define the first nominal behavior; and compiles this behavior template into a first script for a nominal behavior for the first node of the attack graph. For example, the computer system can write a delay time following completion of a preceding action, a port selection, credential handling, and/or other artifacts from the first action in the attack record to the nominal and alternate behaviors associated with the first action.

In this implementation, the computer system can also derive a start condition of the machine prior to the first action and an end condition of the machine following completion of the first action from the attack record, such as: login status; native or web application status; port states; executed processes; file access status; file encryption status; input and output ping status; etc. Accordingly, the computer system can: identify additional procedures of the same (or different) technique configured to produce similar transitions from the start condition to the end condition and/or to produce similar end conditions. The computer system can then: retrieve stored, predefined behavior templates for each of these alternative technique and procedure combinations; populate these predefined behavior templates with artifacts and other characteristics of the first action extracted from the attack record to define the alternative behaviors for the first action; and compile these behavior templates into a first set of alternative scripts for alternative behaviors for the first node of the attack graph.

In particular, in this implementation, the computer system can maintain a library of predefined behavior templates, each representing a different combination of technique, procedure, start condition, and end condition. For example, these predefined behavior templates can be generated by security personnel in the form of generic scripts configured to load artifacts from the attack record (or mock artifacts based on the attack record) to produce custom scripts executable by target assets to emulate actions performed on another machine during previous known attacks. Thus, in this implementation, the computer system can: retrieve predefined behavior templates configured to produce transitions nearest the first action; insert artifacts of the first action from the attack record (or mock artifacts representative of authentic artifacts from the first action, such as locations of to mock data rather than authentic sensitive data) into these predefined behavior templates; and store the resulting scripts as nominal and alternate behaviors for the first action.

In a similar implementation, the computer system: accesses a corpus of scripts previously executed by a population of machines during known attacks and/or emulated attacks and labeled with known techniques, procedures, artifacts, start conditions, and end conditions; scans the corpus of scripts for a subset of scripts labeled with start conditions, end conditions, and/or artifacts nearest the first action; and replaces or inserts authentic and/or mock data based on the attack record to generate a set of scripts for a set of nominal and alternate behaviors executable by the target asset to emulate the first action of the previous attack. For example, the computer system can: implement regression, nearest neighbor, and/or other techniques to characterize similarity scores between the first action and scripts in the corpus of scripts; select highest-scoring scripts and/or a subset of scripts that exceed a minimum similarity score; and configure these scripts to define nominal and alternate behaviors for the first action.

In another implementation, the computer system: accesses a corpus of scripts previously executed by a population of machines during known attacks and/or emulated attacks and labeled with known techniques, procedures, artifacts, start conditions, and end conditions; and implements artificial intelligence, machine learning, regression, and/or other techniques to train an artificial behavior model (e.g., a neural network) configured to ingest a technique, a procedure, a set of artifacts, a start condition, and an end condition of an action from an attack record and to return a set of scripts defining nominal and alternative behaviors and executable by an internal agent on a target asset. Thus, in this example, the computer system can implement the artificial behavior model to automatically construct a set of scripts that represent different techniques and behavior that, when executed by the target asset, are predicted to produce end conditions analogous to the end condition to the machine on the second network following completion of the first action in the known attack.

Yet alternatively, the computer system can interface with security personnel to manually initialize and/or configure the nominal and alternate behaviors for the first action.

2.5.1.1 Examples

In one example, the computer system: identifies a camera activation activity within a first native video chat application defined in the first action in the attack record; generates a nominal behavior defining activation of a camera connected to the target asset via the first native video chat application; generates a second alternative behavior defining activation of the camera via a second native video chat application; generates a third alternative behavior defining activation of the camera via a first video chat web application in a first web browser; generates a fourth alternative behavior defining activation of the camera via a second video chat web application in a second web browser; and compiles these four behaviors into four distinct scripts serially executable by the target asset according to this order based on applications present on the target asset.

In another example, the computer system: identifies generation and transmission of a spoofing email within a first native email client defined in the first action in the attack record; generates a nominal behavior defining generation and transmission of a mock spoofing email via the first native email client; generates a second alternative behavior defining generation and transmission of the mock spoofing email via a second native email client; generates a third alternative behavior defining generation and transmission of the mock spoofing email via a first browser-based native email client; and compiles these three behaviors into three distinct scripts serially executable by the target asset according to this order based on applications present on the target asset. In this example, the computer system can also insert an email address of an email account monitored by the computer system into these scripts to enable the computer system to control and monitor dissemination of this mock spoofing email. The computer system can implement similar methods and techniques to define scripts for nominal and alternate behaviors to generate an email, attach a file to the email, and transmit the email to a controlled email account.

In another example, the computer system: identifies an activity defined in the first action that includes loading a file from an email within a first native email client; generates a nominal behavior defining downloading a mock file in a mock email via the native email client; generates a second alternative behavior defining downloading a mock file in a mock email via a browser-based native email client; generates a third alternative behavior defining downloading a mock file in a mock MMS text message via a browser-based MMS text message client; generates a fourth alternative behavior defining downloading a mock file in a mock webpage via a web browser; and compiles these four behaviors into four distinct scripts serially executable by the target asset according to this order based on applications present on the target asset. In this example, the computer system can also: generate mock emails and mock MMS text messages containing mock files downloadable by the target asset; and generate a flag to transmit these messages to the target asset before or during scheduled execution of the attack graph by the target asset.

2.5.2 Harmful Action Replacement

The computer system can also detect harmful activities within the first action and configure the corresponding nominal and alternate behaviors to emulate harmful activities with reduced risk to the target asset, a user, and the target network.

For example, for the first action, the computer system can: detect data lost during the first action at the machine from the attack record; characterize a technique and a procedure executed by the machine to access the lost data; create mock data analogous to these lost data for loading onto the target asset (or other asset on the target network) prior to executing the attack graph; define a nominal behavior according to the technique and the procedure characteristic of the first action; and select an external agent to receive the mock data if successfully accessed by the target network when executing behaviors of the first node. More specifically, the computer system can: generate mock data of a similar size and format as sensitive data prescribed in the attack record; write a location, address, or other descriptor of the mock data to the nominal and alternate behaviors for the first action; and generate a flag to preload the target asset (or other internal or external asset) with the mock data before executing the attack graph.

In another example, for the first action, the computer system can: detect a hostile hard drive encryption during the first action at the machine from the attack record; characterize a technique and a procedure executed by the machine to encrypt these data; create mock data analogous to (e.g., of a similar size and data format) to data encrypted during the previous attack according to the attack record; generate a flag to load these mock data onto the target asset prior to executing the attack graph; and define a nominal behavior according to the technique and procedure that produced hostile data encryption during the first action.

However, the computer system can implement any other method or technique to generate a set of nominal and alternate behaviors—selectively paired with mock data—for the first action defined in the attack record.

2.5.3 Behavior Hierarchy

The computer system can then assign a hierarchy (e.g., a rank, an order) to the nominal and alternate behaviors in the first node. For example, the computer system can define a hierarchy that assigns highest to priority to behaviors most similar to (e.g., with greatest similarity scores for) the first action the known attack, to behaviors requiring fewest or simplest steps, or to behaviors typically attempted first by attackers. The computer system can write this hierarchy to the first node.

In one implementation, the computer system: defines a first nominal behavior prescribing a first nominal technique and a nominal first procedure of the first action that produced a first end condition at the machine during the known attack; generates a first nominal script executable by the target asset to emulate the first action according to the first nominal technique and the first nominal procedure prescribed by the first nominal behavior; defines a second alternative behavior prescribing the first nominal technique and a second procedure different from the first nominal procedure; and generates a second alternative script executable by the target asset to emulate transition to the first end condition according to the first nominal technique and the second alternative procedure prescribed by the second alternative behavior.

In this implementation, the computer system can also: define a third alternative behavior prescribing the first nominal technique and a third procedure different from the nominal procedure; generate a third alternative script executable by the target asset to emulate transition to the first end condition according to the first nominal technique and the third alternative procedure prescribed by the third alternative behavior; and define a first target hierarchy specifying a) attempted execution of the first script by the target asset, b) attempted execution of the second alternative script by the target asset responsive to failed execution of the first script, and c) attempted execution of the third alternative script by the target asset responsive to failed execution of the second script. Accordingly, when executing the attack graph at a later time, the target asset can: select the first node, in the set of nodes, in the attack graph; execute the first nominal script, corresponding to the first nominal behavior, at a first time in the first time period according to the first target hierarchy; execute the second alternative script, corresponding to the second alternative behavior, at a second time succeeding the first time according to the first target hierarchy in response to detecting prevention of the first nominal script; and execute the third alternative script, corresponding to the third alternative behavior, at a third time succeeding the second time according to the first target hierarchy in response to detecting failed execution of the second alternative script. Then, in response to completion of the third alternative script, the target asset can: select a next node linked to the first node in the attack graph; and execute a second nominal script corresponding to a second nominal behavior stored in the second node, shown in FIG. 6.

Additionally or alternatively in the foregoing implementation, the computer system can: define a third alternative behavior prescribing a second alternative technique different from the first nominal technique; generate a third alternative script executable by the target asset to emulate transition to the first end condition according to the second alternative technique prescribed by the third alternative behavior; and define a first target hierarchy specifying a) attempted execution of the first script by the target asset, b) attempted execution of the second alternative script by the target asset responsive to failed execution of the first script, and c) attempted execution of the third alternative script by the target asset responsive to failed execution of the second script. When executing the attack graph at a later time, the target asset can selectively execute the behaviors in the first node according to this hierarchy.

Therefore, the computer system can define a hierarchy of nominal and alternate behaviors within the first node such that the target asset: attempts a first behavior in the first node; moves to the second node if the first behavior completes successfully; attempts a second behavior in the first node if the first behavior fails to complete; moves to the second node if the second behavior completes successfully; and repeats this process until the target asset either completes a behavior in the first node or attempts all behaviors in the first node.

2.5.4 Next Action and Next Node

The computer system can then repeat this process for each other action in the known attack and populate corresponding nodes in the attack graph with nominal and alternate behaviors and hierarchies.

2.5.5 Device State Return

In one variation, the computer system further: defines a set of reversing behaviors executable by the target surface upon completion of the attack graph to return the target asset to a pre-attack graph state; and stores these behaviors in the attack graph.

In one implementation, for the first action in the sequence of actions, the computer system: defines a first reversing behavior executable by the target asset to transition from a first end condition associated with the first action to a first start condition associated with the first action; and stores the first reversing behavior in a last node in the set of nodes in the attack graph. In this implementation, for a second action in the sequence of actions, the computer system: defines a second reversing behavior executable by the target asset to transition from a second end condition associated with the second action to a second start condition associated with the second action; and stores the second reversing behavior in a penultimate node in the set of nodes in the attack graph; etc. For example, for a node that includes nominal and alternate behaviors that specify downloading a file, the computer system can generate reversing behavior that includes deleting the file. In another example, for a node that includes nominal and alternate behaviors that specify opening a particular communication port, the computer system can generate reversing behavior that includes closing the particular communication port. In yet another example, for a node that includes nominal and alternate behaviors that specify opening and streaming a camera feed, the computer system can generate reversing behavior that includes closing the camera feed.

In this implementation, when executing the knowledge graph, the target asset can store an identifier of each completed behavior. Upon completing the attack graph, the target asset can: aggregate identifiers of these completed behaviors; select or retrieve a sequence of reversing behaviors corresponding to these completed behaviors; and sequentially execute these particular reversing behaviors in reverse order of the completed nominal and alternate behaviors.

2.5.6 Attack Graph Construction

Block S240 of the second method S200 recites linking the set of nodes in the attack graph according to the sequence of actions representing the known attack in the attack record. Generally, in Block S240, the computer system can compile these nominal and alternate behaviors into the attack graph executable by the target asset on the target network to emulate the known attack that occurred previously on the machine on the second network.

For example the computer system can: link a first subset of nodes in the attack graph, storing nominal behaviors and alternative behaviors, according to the sequence of actions representing the known attack in the attack record; and link a second subset of nodes in the attack graph, storing reversing behaviors, according to an inverse of the sequence of actions representing the known attack in the attack record; etc.

The computer system can then publish the attack graph for scheduling instances on a population of target assets on the target network.

2.5.7 Example: Target Attack

In one example, for a first action in the sequence of actions, the computer system: defines a first nominal behavior prescribing downloading a payload from an email to emulate a first end condition at the target asset according to the first action in the known attack; and defines a first alternative behavior prescribing downloading the payload from a website to emulate the first end condition at the target asset according to the first action in the known attack.

In this example, for a second action in the sequence of actions, the computer system can also define a second nominal behavior prescribing executing the payload to emulate a second end condition at the target asset according to the second action in the known attack.

In this example, for a third action in the sequence of actions, the computer system can: define a third nominal behavior prescribing copying data, detected in memory, of a target data type to emulate a third end condition at the target asset according to the third action in the known attack; and define a third alternative behavior prescribing copying data, detected in memory and of the target data type, with evasive security procedures to emulate the third end condition at the target asset according to the third action in the known attack.

In this example, for a fourth action in the sequence of actions, the computer system can: define a fourth nominal behavior prescribing creating a share, moving data of the target data type, removing the share, and sending notification pings at a first frequency to emulate a fourth end condition at the target asset according to the fourth action in the known attack; and define a fourth alternative behavior prescribing creating the share, moving data of the target data type, removing the share, and sending notification pings at a second frequency less than the first frequency to emulate the fourth end condition at the target asset according to the fourth action in the known attack.

Furthermore, for a fifth action in the sequence of actions, the computer system can: define a fifth nominal behavior prescribing transmitting data of the target data type unencrypted to a second machine to emulate a fifth end condition at the target asset according to the fifth action in the known attack; and define a fifth alternative behavior prescribing transmitting encrypted data of the target data type to the second machine to emulate the fifth end condition at the target asset according to the fifth action in the known attack.

In this example, the computer system can also: generate a set of data of the target data type and including mock values; select the second machine external to the target network; and load the set of data onto the target asset prior to the first time period. Later, the computer system can characterize the target network as vulnerable to the known attack in response to receipt of the set of target data by the second machine during the first time period.

Thus, in this example, the computer system can generate an attack graph executable by a target asset to emulate a network breach in which an attacker: downloads a payload to a contractor device via a phishing email; collects login credentials via the execution of the payload; logs into a network; detects and collects new write data containing credit card information; generates pings to a remote machine to offload these data; and exfiltrates these data. However, the computer system can also generate mock data to replace credit card data from the known attack and can reconfigure nominal and alternate behaviors for the corresponding action to detect and collect these mock data rather than authentic credit card data. Thus, when executing this attack graph, the target asset can emulate this breach by attempting different paths for each stage of the attack but exfiltrate mock—and therefore low-value—data from the target network.

2.6 Scheduler

Block S250 of the second method S200 recites scheduling the target asset on the target network to selectively execute nominal behaviors and alternative behaviors, according to target hierarchies, stored in the set of nodes in the attack graph during a first time period. Generally, in Block S250, the computer system (e.g., the coordination service) can schedule one or a population of assets on the target network to individually and autonomously execute the attack graph, such as serially or concurrently over a test period, as shown in FIG. 5.

More specifically, because the attack graph contains multiple options for emulating individual stages of the known attack and is represented in a tree or hierarchy of scripts, the computer system can schedule many target assets on (i.e., connected to) the target network to execute the attack graph over time in order to detect vulnerability of these individual assets, regions of the target network, and the target network as a whole to the known attack and attack analogs over time.

In one example, the computer system schedules an endpoint device—connected to the target network—to emulate the known attack on the network by automatically executing nominal behaviors and alternative behaviors stored in the set of nodes in the attack graph. In this example, the computer system can automatically select this target asset—from a set of assets connected to the network hosted by an organization—assigned to a user in a group of users including: an executive of the organization; a contractor contracted by the organization; a member of a billing department; a member of a human resources department; and other individuals within the organization who hold sensitive information and executive-level privileges.

Alternatively, the computer system can set an attack graph execution frequency (e.g., five instances per day) and pseudorandomly select endpoint devices connected to the target network to execute the attack graph per time interval (e.g., five endpoint devices per day).

Upon selecting these target assets, the computer system can coordinate distribution of mock data to these target assets and external assets to support the completion of the attack graph by the target assets.

2.6.1 Attack Graph Permutations

Generally, each target asset executing the attack graph may exhibit different security tool configurations and may be loaded with different software and applications. Accordingly, these target assets may execute different combinations of behaviors within nodes of the attack graph, such as: due to prevention of certain behaviors by the security tools; and/or due to absence of a software or application necessary to complete the behavior on the target asset. Therefore, the computer system can deploy the single, "generic" attack graph to many target assets, and these target assets can cooperate to test hardness of security tools on the target network against various combinations of behaviors within the attack graph.

In one variation, the computer system also generates multiple attack graphs containing different characteristics, such as: different behavior hierarchies (i.e., resorted or re-ranked behaviors) within each node; different timing triggers for attempting behaviors within a single node; different timing triggers for transition between nodes of the attack graph; and/or different mock data. The computer system then schedules multiple target assets on the target network to execute these different attack graphs.

For example, the computer system can schedule a first target asset to complete one behavior stored in each node, in the set of nodes in the attack graph within a first time duration, such as as rapidly as possible with no delay between behavior attempts within each node and with no delay between nodes in order to test prevention latency of security tools deployed on the network in the presence of a rapid attack on the target network. In this example, the computer system can also schedule a second target asset to complete one behavior stored in each node in the attack graph within a second time duration greater than the first time duration, such as with a one hour delay between behavior attempts within each node and with a delay of two days between nodes in order to test sensitivity of security tools deployed on the network to a slow attack in which threat signals may be lost in or overwhelmed by benign device and network traffic over longer time intervals.

Similarly, by defining different behavior hierarchies within nodes of the attack graph for different target assets, the computer system can test sensitivity of security tools—deployed on the network—to detecting and preventing different techniques and protocols that produce similar results within each stage of the known attack.

2.7 Attack Graph Execution

The target asset can then execute the attack graph according to the schedule (e.g., a start time, an attack graph period) set by the computer system (e.g., by the coordination service).

In particular, the computer system can execute methods and techniques described above to: select a first node in the attack graph; execute a first script defining a first behavior in the first node; move to the second node in the attack graph if the first script successfully completes; execute a second script defining a second behavior in the first node if the first behavior fails to complete; moves to the second node if the second behavior successfully completes; and repeat this process until the target asset either completes a behavior in the first node or attempts all behaviors in the first node. The target asset then repeats this process for each subsequent node of the attack graph or until the target asset fails to complete any single behavior in one node of the attack graph.

2.7.1 Continue if Prevented

In one variation, the computer system configures each node of the attack graph for execution regardless of completion of the preceding node of the attack graph. Accordingly, the target asset can: serially attempt behaviors within a single node in the attack graph; and move to a next node in the attack graph in response to either successfully completing a behavior in the preceding node or attempting every behavior in the preceding node. Thus, the computer system and the target asset can cooperate to test hardness of security tools deployed on the network to preventing the known attack as a whole and detecting and/or preventing individual stages of the known attack.

2.7.2 Manual Intervention

Additionally or alternatively, the computer system can configure a node in the attack graph for manual intervention responsive to failure by the target asset to complete any single behavior in the node. Accordingly, the target asset can: serially attempt behaviors within a single node in the attack graph; pause execution of the attack graph; and transmit a prompt to security personnel to manually attempt actions analogous to the behaviors in the node at the target assets in response to failure to complete any behavior in the node. For example, the target asset can: generate an electronic notification; populate this electronic notification with descriptions of the known attack, the corresponding action within the known attack, the target end condition at the target assets following completion of the node, the attack graph, the node, failed behaviors within the node, and/or artifacts of failed behaviors in the node, etc.; and transmit this notification to a security portal associated with the target network. The target asset can then enable command and control for the security personnel and/or return results and artifacts of behaviors completed by the target asset in preceding nodes of the attack graph to the security personnel. The security personnel may then manually attempt other actions to achieve a change of state at the target asset represented by the current node of the attack graph (or "hack" the target asset to replicate the corresponding action in the known attack). Upon successfully completing these actions, the security personnel may return a trigger to the attack graph to resume execution of the attack graph at a next node.

2.7.3 Multi-Asset Attack Graph

In one variation, the computer system: generates a paired set of attack graphs executable concurrently by a set of target assets; and implements methods and techniques described in U.S. patent application Ser. No. 17/083,275 to coordinate execution of individual nodes in each attack graph by these target assets in order to emulate—on the target network—a previous coordinated multi-asset attack on the second network.

For example, the computer system can access the attack record that defines: a first sequence of actions executed on a first machine on the second computer network during a known attack on the second computer network; and a second sequence of actions executed on a second machine on the second computer network during the known attack on the second computer network. The computer system can then execute methods and techniques described above: to generate a first attack graph based on the first sequence of actions; and to generate a second attack graph based on the second sequence of actions.

The computer system can then: schedule the first target asset on the target network to selectively execute nominal behaviors and alternative behaviors stored in the first set of nodes in the first attack graph during a particular time period; and similarly schedule a second target asset on the target network to selectively execute nominal behaviors and alternative behaviors stored in the second set of nodes in the second attack graph during the particular time period.

2.7.3.1 Independent Multi-Asset Attack Graph Execution

For example, during the first time period, the computer system (e.g., the coordination service) can transmit a first trigger to selectively execute behaviors, in a first set of nominal behaviors and alternative behaviors stored in a first node, in the set of nodes, in the attack graph to the target asset. Then, in response to receiving the first trigger, the first target asset can sequentially attempt execution of behaviors, in the first set of nominal behaviors and alternative behaviors stored in the first node in the attack graph, according to a first hierarchy stored in the first node. In response to completing a first behavior, in the first set of nominal behaviors and alternative behaviors, the first target asset can return a first confirmation to the coordination service.

In response to receiving the first confirmation from the target asset, the coordination service can transmit a second trigger to selectively execute behaviors, in a second set of nominal behaviors and alternative behaviors stored in a second node, in the second set of nodes, in the second attack graph to the second target asset. In response to receiving the second trigger, the second target asset can sequentially attempt execution of behaviors, in the second set of nominal behaviors and alternative behaviors stored in the second node in the attack graph, according to a second hierarchy stored in the second node. In response to completing a second behavior, in the second set of nominal behaviors and alternative behaviors, the second target asset can return a second confirmation to the coordination service.

In response to receiving the second confirmation from the second target asset, the coordination service transmits a third trigger to selectively execute behaviors, in a third set of nominal behaviors and alternative behaviors stored in a third node, in the first set of nodes, in the attack graph to the first asset. In response to receiving the third trigger, the first target asset sequentially attempts execution of behaviors, in the third set of nominal behaviors and alternative behaviors stored in the third node in the attack graph, according to a third hierarchy stored in the first node. In response to completing a third behavior, in the third set of nominal behaviors and alternative behaviors, the first target asset returns a third confirmation to the coordination service.

The coordination service, the first target asset, and the second target asset can repeat this process to complete the first and second attack graphs. Therefore, in this example, the first and second target assets can independently attempt and select behaviors within nodes of their assigned attack graphs; and the coordination service can function to confirm individual nodes at the first target asset when the second target asset completes a next node, and vice versa.

2.7.3.2 Staged Multi-Asset Attack Graph Execution

In a similar example, during the first time period, the computer system (e.g., the coordination service) can transmit a first trigger to selectively execute behaviors, in a first set of nominal behaviors and alternative behaviors stored in a first node, in the set of nodes, in the attack graph to the target asset. Then, in response to receiving the first trigger, the first target asset can sequentially attempt execution of behaviors, in the first set of nominal behaviors and alternative behaviors stored in the first node in the attack graph, according to a first hierarchy stored in the first node. In response to completing a first behavior, in the first set of nominal behaviors and alternative behaviors, the first target asset can return a first confirmation, identification of the first completed behavior, and first set of artifacts of this behavior to the coordination service.

In response to receiving the first confirmation from the target asset, the coordination service can: identify a subset of behaviors in a second node of the second attack graph linked to the first completed behavior from the first node of the first attack graph; and transmit the first set of artifacts and a second trigger to selectively execute this subset of behaviors, defined in the second node in the second attack graph, to the second target asset. In response to receiving the second trigger, the second target asset can sequentially attempt execution of this subset of behaviors, stored in the second node in the second attack graph, according to a second hierarchy stored in the second node and based on the first set of artifacts from the first completed behavior. In response to completing a second behavior, in the subset of behaviors, the second target asset can return a second confirmation, identification of the second completed behavior, and second set of artifacts of this behavior to the coordination service.

The coordination service, the first target asset, and the second target asset can repeat this process to complete the first and second attack graphs. Therefore, in this example, the first and second target assets can pass identities of completed behaviors and corresponding artifacts to the coordination service, which then passes the artifacts and behavior selections (or new behavior hierarchies) to the opposing asset to inform selection and execution of the neck node in the attack graphs.

However, the computer system and/or the coordination service can implement any other method or technique to coordinate execution of multiple concurrent attack graphs by multiple assets on the target network.

2.8 Vulnerability

Block S260 of the second method S200 recites accessing a set of alerts generated by a set of security tools, deployed on the target network, during the first time period. Block S270 of the second method S200 recites characterizing a vulnerability of the target network based on presence of alerts, in the set of alerts, indicating detection and prevention of nominal behaviors and alternative behaviors, stored in nodes in the attack graph, executed by the target asset during the first time period. Generally, in Blocks S260 and S270, the computer system can: aggregate alerts generated by security tools deployed on the computer network while the target asset executed the attack graph; identify a subset of alerts corresponding with behaviors in the attack graph executed by the target asset; predict vulnerability of the target network to the known attack and similar variants based on types and presence of detection and prevention alerts in this subset of alerts; and/or predict vulnerability of the target network to the known attack and similar variants based on whether the target asset completed at least one behavior in each node in the attack graph, shown in FIG. 5.

In one implementation, the computer system: accesses prevention alerts published by the set of security tools and indicating prevention of behaviors occurring on the target network by the set of security tools during the scheduled period of the attack graph executed by the target asset in Block S260; scans the set of alerts for a prevention alert corresponding to a behavior—stored in a node in the set of nodes in the attack graph—attempted by the target asset during this scheduled period; and characterizes the target network as vulnerable to the known attack in response to absence of the particular prevention alert in the set of prevention alerts in Block S270. More specifically, if the set of prevention alerts omits a prevention alert that resulted in termination of a node of the attack graph and thus failed completion of the attack graph by the target asset, the computer system can identify the target asset—and the target network more generally—as vulnerable to the known attack and analogs. Similarly, the computer system can characterize the target network as vulnerable to the known attack in response to completion of a behavior in a last node of the attack graph by the target asset in Block S270.

In another implementation, the computer system can: access detection alerts published by the set of security tools and indicating detection of behaviors, occurring on the target network, by the set of security tools; and similarly access prevention alerts published by the set of security tools and indicating prevention of behaviors, occurring on the target network, by the set of security tools in Block S260. The computer system can then: correlate a subset of alerts, in this set of alerts, with behaviors executed by the target asset according to the attack graph; and calculate a vulnerability (e.g., a vulnerability score) of the target network to the known attack inversely proportional to a quantity of alerts in the subset of alerts, and presence of a prevention alert in the subset of alerts. More specifically, a generation of a greater frequency of detection and prevention alerts by the security tools responsive to behaviors attempted by the target asset according to the attack graph may indicate greater hardness of the target asset and the target network against the known attack and analogs. Therefore, the computer system can calculate a lesser vulnerability (e.g., a lower vulnerability score) of the target network to the known attack in response to a high ratio of detection and prevention alerts generated by the security tools per behavior in the attack graph attempted by the target asset.

Additionally or alternatively, the computer system can detect vulnerability of the target network to the known attack and analogs proportional to a quantity of nodes in the attack graph containing at least one behavior completed by the target asset. More specifically, the computer system can: detect low vulnerability to the known attack if security tools deployed on the target network prevent completion of a single behavior in a first node in the attack graph; detect high vulnerability to the known attack if security tools deployed on the target network fail to prevent completion of a single behavior in a penultimate node in the attack graph; and detect very high vulnerability to the known attack if security tools deployed on the target network fail to prevent completion of a single behavior in a last node in the attack graph.

For example, the computer system can generate an attack graph containing: a first node corresponding to a first action in the sequence of actions representing the known attack; a second node corresponding to a second action in the sequence of actions representing the known attack; and a third node corresponding to a third action in the sequence of actions representing the known attack. Later the computer system can: access a set of alerts generated by a set of security tools, deployed on the target network, in Block S260; correlate a first alert, in the set of alerts, with a first behavior stored in the first node and attempted by the target asset during the first time period; correlate a second alert, in the set of alerts, with a second behavior stored in the second node and attempted by the target asset during the first time period; and correlate a third alert, in the set of alerts, with a third behavior stored in the third node and attempted by the target asset during the first time period. Accordingly, the computer system can calculate a first vulnerability level of the target network in response to the first alert including a first prevention alert. Conversely, the computer system can calculate a second vulnerability level of the target network, greater than the first vulnerability level, in response to: the first alert excluding the first prevention alert; and the second alert including a second prevention alert. Furthermore, the computer system can calculate a third vulnerability level of the target network, greater than the second vulnerability level, in response to: the first alert excluding the first prevention alert; the second alert excluding the second prevention alert; and the third alert including a third prevention alert.

The computer system can then return the vulnerability (e.g., a vulnerability score) of the target network to security personnel, such as via a vulnerability report.

As described above, the computer system can also: aggregate identifiers and/or descriptors of behaviors successfully completed by the target asset, behaviors completed by the attack graph and detected but not prevented by the security tools, and behaviors attempted by the target asset but prevented by the security tools; and populate the vulnerability report with these data.

Security personnel may then selectively reconfigure these security tools to achieve different combinations of prevention and detection of these behaviors and thus reduce vulnerability of the target network to the known attack and analogs.

2.8.1 Multi-Instance Vulnerability

In one variation, the computer system derives a vulnerability of the target network to the known attack and analogs based on detection and prevention results collected during multiple instances of the attack graph executed by multiple target assets on the target network over time.

In one implementation, the computer system can coordinate execution of two instance of the attack graph by two target assets during a target time period, such as executing over different time intervals to test latency and sensitivity of the security tools on the target network to actions of the known attack. For example, the computer system can: schedule the first target asset to complete one behavior stored in each node in the attack graph within a first time duration within the target time period; and schedule the second agent to complete one behavior stored in each node in the attack graph within a second time duration, greater than the first time duration, within the target time period. In this implementation, the computer system can: access a set of alerts generated by a set of security tools, deployed on the target network, in Block S260 and characterize a vulnerability of the target network in Block S270 inversely proportional to: presence of alerts indicating detection and prevention of nominal behaviors and alternative behaviors, defined in nodes in a first attack graph, executed by a first target asset during this time period; and presence of alerts indicating detection and prevention of nominal behaviors and alternative behaviors, defined in nodes in the second instance of the attack graph, executed by the second target asset during this time period. Additionally or alternatively, the computer system can: characterize vulnerability of the target network due to latency of security tools inversely proportional to presence of alerts indicating detection and prevention of nominal behaviors and alternative behaviors, defined in nodes in a first attack graph, executed by a first target asset during this time period; and characterize vulnerability of the target network due to low sensitivity of security tools inversely proportional to presence of alerts indicating detection and prevention of nominal behaviors and alternative behaviors, defined in nodes in the second instance of the attack graph, executed by the second target asset during this time period.

Therefore, the computer system can: compile results of multiple instances of the attack graph executed by multiple target assets into a vulnerability assessment of the target network during the corresponding time period; and return this vulnerability assessment to security personnel.

2.8.2 Additional Attack Graph Instances

Additionally or alternatively, the computer system can schedule additional instances of the attack graph on the same and/or other target assets based on detected vulnerability of the target network to the known attack.

In one implementation, in response to characterizing the vulnerability of the target network greater than a threshold vulnerability based on results of a first instance of the attack graph executed by a the target asset on the target network, the computer system: schedules a second target asset—distinct from the target asset—on the target network to selectively execute nominal behaviors and alternative behaviors stored in the set of nodes in the attack graph during a second time period; schedules a third asset—distinct from the target asset—on the target network to selectively execute nominal behaviors and alternative behaviors stored in the set of nodes in the attack graph during the second time period; accesses a second set of alerts generated by the set of security tools, deployed on the target network, during the second time period; and characterizes a scope of the vulnerability of the target network based on presence of alerts, in the second set of alerts, indicating detection and prevention of nominal behaviors and alternative behaviors, stored in nodes in the attack graph, executed by the second target asset and the third asset during the second time period.

Therefore, in this implementation, if the computer system detects vulnerability of the target network to the known attack at the first target asset, the computer system can: automatically schedule execution of additional instances of the attack graph by other target assets on the target network (e.g., at different locations on the target network, exhibiting characteristics different from the first target asset); characterize an extent of the vulnerability to the known attack across the target network based on locations of these other target assets on the target network and results of the additional instances of the attack graph; and report the scope of the vulnerability of the target network to security personnel affiliated with the target network.

However, the computer system can selectively schedule additional instances of the attack graph in any other way and responsive to any other characteristic vulnerability of the target network to the known attack.

As a person skilled in the art will recognize from the previous detailed description and from the figures and claims, modifications and changes can be made to the embodiments of the invention without departing from the scope of this invention as defined in the following claims.

We claim:
1. A method comprising:
  accessing an attack record defining a sequence of actions executed on a machine on a second computer network and representing a known attack on the second computer network;
  initializing an attack graph comprising a set of nodes;

for each action in the sequence of actions:
  based on the attack record, deriving a start condition at the machine prior to start of the action;
  based on the attack record, deriving an end condition at the machine following completion of the action;
  based on the attack record, defining a nominal behavior:
    representing the action executed by the machine during the known attack; and
    executable by a target asset on a target network to emulate the action;
  defining a set of alternative behaviors:
    analogous to the nominal behavior; and
    executable by the target asset to emulate a transition from the start condition to the end condition at the target asset;
  defining a target hierarchy for the nominal behavior and the set of alternative behaviors; and
  storing the nominal behavior and the set of alternative behaviors according to the target hierarchy in a node in the set of nodes in the attack graph;
linking the set of nodes in the attack graph according to the sequence of actions representing the known attack in the attack record;
scheduling the target asset on the target network to selectively execute nominal behaviors and alternative behaviors, according to target hierarchies, stored in the set of nodes in the attack graph during a first time period;
accessing a set of alerts generated by a set of security tools, deployed on the target network, during the first time period; and
characterizing a vulnerability of the target network based on presence of alerts, in the set of alerts, indicating detection and prevention of nominal behaviors and alternative behaviors, stored in nodes in the attack graph, executed by the target asset during the first time period.

2. The method of claim 1:
further comprising:
  initializing a second attack graph comprising a second set of nodes;
  for each action in the sequence of actions:
    defining a second hierarchy for the nominal behavior and the set of alternative behaviors; and
    storing a nominal behavior and a set of alternative behaviors, analogous to the action, according to the second hierarchy in a node in the second set of nodes in the second attack graph;
  linking the second set of nodes in the second attack graph according to the sequence of actions representing the known attack in the attack record; and
  scheduling a second agent on the target network to selectively execute nominal behaviors and alternative behaviors, according to second hierarchies, stored in the second set of nodes in the second attack graph during the first time period; and
wherein characterizing the vulnerability of the target network during the first time period comprises characterizing the vulnerability of the target network inversely proportional to:
  presence of alerts, in the set of alerts, indicating detection and prevention of nominal behaviors and alternative behaviors, defined in nodes in the attack graph, executed by the target asset during the first time period; and
  presence of alerts, in the set of alerts, indicating detection and prevention of nominal behaviors and alternative behaviors, defined in nodes in the second attack graph, executed by the second agent during the first time period.

3. The method of claim 2:
wherein scheduling the target asset on the target network to selectively execute nominal behaviors and alternative behaviors stored in the set of nodes in the attack graph comprises scheduling the target asset to complete one behavior stored in each node, in the set of nodes, in the attack graph within a first time duration within the first time period; and
wherein scheduling the second agent on the target network to selectively execute nominal behaviors and alternative behaviors stored in the second set of nodes in the second attack graph comprises scheduling the second agent to complete one behavior stored in each node, in the second set of nodes, in the second attack graph within a second time duration, greater than the first time duration, within the first time period.

4. The method of claim 1:
wherein accessing the set of alerts generated by the set of security tools, deployed on the target network, during the first time period comprises:
  accessing prevention alerts published by the set of security tools and indicating prevention of behaviors, occurring on the target network, by the set of security tools; and
wherein characterizing the vulnerability of the target network during the first time period comprises:
  scanning the set of alerts for a particular prevention alert corresponding to a behavior, stored in a node in the set of nodes in the attack graph, attempted by the target asset during the first time period; and
  characterizing the target network as vulnerable to the known attack in response to absence of the particular prevention alert in the set of prevention alerts.

5. The method of claim 1:
wherein accessing the set of alerts generated by the set of security tools, deployed on the target network, during the first time period comprises:
  accessing detection alerts published by the set of security tools and indicating detection of behaviors, occurring on the target network, by the set of security tools; and
  accessing prevention alerts published by the set of security tools and indicating prevention of behaviors, occurring on the target network, by the set of security tools; and
wherein characterizing the vulnerability of the target network during the first time period comprises:
  correlating a subset of alerts, in the set of alerts, with behaviors executed by the target asset according to the attack graph during the first time period; and
  calculating the vulnerability of the target network to the known attack inversely proportional to:
    a quantity of alerts in the subset of alerts; and
    presence of a prevention alert in the subset of alerts.

6. The method of claim 1:
wherein initializing the attack graph comprises initializing the attack graph comprising:
  a first node corresponding to a first action in the sequence of actions representing the known attack;
  a second node corresponding to a second action in the sequence of actions representing the known attack; and a third node corresponding to a third action in the sequence of actions representing the known attack; and wherein characterizing the vulnerability of the target network during the first time period comprises:
correlating a first alert, in the set of alerts, with a first behavior stored in the first node and attempted by the target asset during the first time period;
correlating a second alert, in the set of alerts, with a second behavior stored in the second node and attempted by the target asset during the first time period;
correlating a third alert, in the set of alerts, with a third behavior stored in the third node and attempted by the target asset during the first time period;
calculating a first vulnerability level of the target network in response to the first alert comprising a first prevention alert;
calculating a second vulnerability level of the target network, greater than the first vulnerability level, in response to:
the first alert excluding the first prevention alert; and
the second alert comprising a second prevention alert; and
calculating a third vulnerability level of the target network, greater than the second vulnerability level, in response to:
the first alert excluding the first prevention alert;
the second alert excluding the second prevention alert; and
the third alert comprising a third prevention alert.

7. The method of claim 1, wherein defining a nominal behavior and defining a set of alternative behaviors for each action in the sequence of actions comprises, for a first action in the sequence of actions:
defining a first nominal behavior prescribing a first nominal technique and a first nominal procedure of the first action that produced a first end condition at the machine during the known attack;
generating a first nominal script executable by the target asset to emulate the first action according to the first nominal technique and the first nominal procedure prescribed by the first nominal behavior;
defining a second alternative behavior prescribing the first nominal technique and a second alternative procedure different from the first nominal procedure; and
generating a second alternative script executable by the target asset to emulate transition to the first end condition according to the first nominal technique and the second alternative procedure prescribed by the second alternative behavior.

8. The method of claim 1, wherein defining a nominal behavior, defining a set of alternative behaviors, and defining a target hierarchy for the nominal behavior and the set of alternative behaviors for each action in the sequence of actions comprises, for the first action in the sequence of actions:
defining a third alternative behavior prescribing the first nominal technique and a third alternative procedure different from the nominal procedure;
generating a third alternative script executable by the target asset to emulate transition to the first end condition according to the first nominal technique and the third alternative procedure prescribed by the third alternative behavior; and
defining a first target hierarchy specifying:
attempted execution of the first nominal script by the target asset;
attempted execution of the second alternative script by the target asset responsive to failed execution of the first nominal script; and
attempted execution of the third alternative script by the target asset responsive to failed execution of the second nominal script.

9. The method of claim 8, further comprising, by the target asset during first time period:
selecting a first node, in the set of nodes, in the attack graph;
executing the first nominal script, corresponding to the first nominal behavior, at a first time in the first time period according to the first target hierarchy;
in response to detecting prevention of the first nominal script, executing the second alternative script, corresponding to the second alternative behavior, at a second time succeeding the first time in the first time period according to the first target hierarchy;
in response to detecting failed execution of the second alternative script, executing the third alternative script, corresponding to the third alternative behavior, at a third time succeeding the second time in the first time period according to the first target hierarchy; and
in response to completion of the third alternative script:
selecting a second node, in the set of nodes, linked to the first node in the attack graph; and
executing a second nominal script corresponding to a second nominal behavior stored in the second node.

10. The method of claim 7, wherein defining a nominal behavior, defining a set of alternative behaviors, and defining a target hierarchy for the nominal behavior and the set of alternative behaviors for each action in the sequence of actions comprises, for the first action in the sequence of actions:
defining a third alternative behavior prescribing a second alternative technique different from the first nominal technique;
generating a third alternative script executable by the target asset to emulate transition to the first end condition according to the second alternative technique prescribed by the third alternative behavior; and
defining a first target hierarchy specifying:
attempted execution of the first nominal script by the target asset;
attempted execution of the second alternative script by the target asset responsive to failed execution of the first nominal script; and
attempted execution of the third alternative script by the target asset responsive to failed execution of the second alternative script.

11. The method of claim 1:
further comprising, for each action in the sequence of actions:
defining a reversing behavior executable by the target asset to transition from an end condition associated with the action to a start condition associated with the action; and
storing the reversing behavior in a node in the set of nodes in the attack graph;
wherein linking the set of nodes in the attack graph comprises:
linking a first subset of nodes in the attack graph, storing nominal behaviors and alternative behaviors, according to the sequence of actions representing the known attack in the attack record; and linking a second subset of nodes in the attack graph, storing reversing behaviors, according to an inverse of the sequence of actions representing the known attack in the attack record; and further comprising, by the target asset:

during the first time period, selectively executing nominal behaviors and alternative behaviors stored in the first subset of nodes; and in response to completing emulation of the known attack according to the first subset of nodes, sequentially executing reversing behaviors stored in the second subset of nodes.

12. The method of claim 1, wherein defining a nominal behavior and defining a set of alternative behaviors for each action in the sequence of actions comprises:

for a first action in the sequence of actions:

defining a first nominal behavior prescribing downloading a payload from an email to emulate a first end condition at the target asset according to the first action in the known attack; and defining a first alternative behavior prescribing downloading the payload from a website to emulate the first end condition at the target asset according to the first action in the known attack;

for a second action in the sequence of actions:

defining a second nominal behavior prescribing executing the payload to emulate a second end condition at the target asset according to the second action in the known attack;

for a third action in the sequence of actions:

defining a third nominal behavior prescribing copying data, detected in memory, of a target data type to emulate a third end condition at the target asset according to the third action in the known attack; and defining a third alternative behavior prescribing copying data, detected in memory and of the target data type, with evasive security procedures to emulate the third end condition at the target asset according to the third action in the known attack;

for a fourth action in the sequence of actions:

defining a fourth nominal behavior prescribing creating a share, moving data of the target data type, removing the share, and sending notification pings at a first frequency to emulate a fourth end condition at the target asset according to the fourth action in the known attack; and defining a fourth alternative behavior prescribing creating the share, moving data of the target data type, removing the share, and sending notification pings at a second frequency less than the first frequency to emulate the fourth end condition at the target asset according to the fourth action in the known attack; and for a fifth action in the sequence of actions:

defining a fifth nominal behavior prescribing transmitting data of the target data type unencrypted to a second machine to emulate a fifth end condition at the target asset according to the fifth action in the known attack; and defining a fifth alternative behavior prescribing transmitting encrypted data of the target data type to the second machine to emulate the fifth end condition at the target asset according to the fifth action in the known attack.

13. The method of claim 12:

further comprising:

generating a set of target data of the target data type and comprising mock values;

selecting the second machine external to the target network; and loading the set of target data onto the target asset prior to the first time period; and wherein characterizing the vulnerability of the target network comprises characterizing the target network as vulnerable to the known attack in response to receipt of the set of target data by the second machine during the first time period.

14. The method of claim 1:

wherein accessing the attack record comprises accessing the attack record defining:

the sequence of actions executed on the machine on the second computer network during the known attack on the second computer network; and a second sequence of actions executed on a second machine on the second computer network during the known attack on the second computer network; and further comprising:

initializing a second attack graph comprising a second set of nodes;

for each action in the second sequence of actions:

based on the attack record, deriving a start condition at the second machine prior to start of the action;

based on the attack record, deriving an end condition at the second machine following completion of the action;

based on the attack record, defining a nominal behavior:

representing the action executed by the second machine during the known attack; and executable by a second asset to emulate the action;

defining a set of alternative behaviors:

analogous to the nominal behavior; and executable by the second asset to emulate a transition from the start condition to the end condition at the second asset;

defining a second target hierarchy for the nominal behavior and the set of alternative behaviors; and storing the nominal behavior and the set of alternative behaviors according to the second target hierarchy in a node in the second set of nodes in the second attack graph;

linking the second set of nodes in the second attack graph according to the second sequence of actions by the second machine during known attack; and scheduling the second asset on the target network to selectively execute nominal behaviors and alternative behaviors, according to target hierarchies, stored in the second set of nodes in the second attack graph during the first time period.

15. The method of claim 14, further comprising, during the first time period:

by a coordination service:

transmitting a first trigger to selectively execute behaviors, in a first set of nominal behaviors and alternative behaviors stored in a first node, in the set of nodes, in the attack graph to the target asset;

by the target asset:

in response to receiving the first trigger, sequentially attempting execution of behaviors, in the first set of nominal behaviors and alternative behaviors stored in the first node in the attack graph, according to a first hierarchy stored in the first node; and in response to completing a first behavior, in the first set of nominal behaviors and alternative behaviors, returning a first confirmation to the coordination service;

by the coordination service:
in response to receiving the first confirmation from the target asset, transmitting a second trigger to selectively execute behaviors, in a second set of nominal behaviors and alternative behaviors stored in a second node, in the second set of nodes, in the second attack graph to the second asset;

by the second asset:
in response to receiving the second trigger, sequentially attempting execution of behaviors, in the second set of nominal behaviors and alternative behaviors stored in the second node in the second attack graph, according to a second hierarchy stored in the second node; and
in response to completing a second behavior, in the second set of nominal behaviors and alternative behaviors, returning a second confirmation to the coordination service;

by the coordination service:
in response to receiving the second confirmation from the second asset, transmitting a third trigger to selectively execute behaviors, in a third set of nominal behaviors and alternative behaviors stored in a third node, in the first set of nodes, in the attack graph to the target asset; and by the target asset:
in response to receiving the third trigger, sequentially attempting execution of behaviors, in the third set of nominal behaviors and alternative behaviors stored in the third node in the attack graph, according to a third hierarchy stored in the first node; and
in response to completing a third behavior, in the third set of nominal behaviors and alternative behaviors, returning a third confirmation to the coordination service.

16. The method of claim 1, further comprising, in response to characterizing the vulnerability of the target network greater than a threshold vulnerability:
scheduling a second asset on the target network to selectively execute nominal behaviors and alternative behaviors stored in the set of nodes in the attack graph during a second time period, the second asset distinct from the target asset;
scheduling a third asset on the target network to selectively execute nominal behaviors and alternative behaviors stored in the set of nodes in the attack graph during the second time period, the third asset distinct from the target asset and the second asset;
accessing a second set of alerts generated by the set of security tools, deployed on the target network, during the second time period; and
characterizing a scope of the vulnerability of the target network based on presence of alerts, in the second set of alerts, indicating detection and prevention of nominal behaviors and alternative behaviors, stored in nodes in the attack graph, executed by the second asset and the third asset during the second time period.

17. The method of claim 1, wherein scheduling the target asset on the target network to selectively execute nominal behaviors and alternative behaviors stored in the set of nodes in the attack graph comprises scheduling the target asset, comprising an endpoint device connected to the target network, to emulate the known attack on the target network by automatically executing nominal behaviors and alternative behaviors stored in the set of nodes in the attack graph.

18. The method of claim 17, wherein scheduling the target asset to emulate the known attack on the target network comprises selecting the target asset from a set of assets connected to the target network hosted by an organization and assigned to a user in a group of users comprising:
an executive of the organization; and
a contractor contracted by the organization.

19. A method comprising:
accessing an attack record defining a sequence of actions executed on a machine on a second computer network and representing a known attack on the second computer network;
initializing an attack graph comprising a set of nodes;
for each action in the sequence of actions:
a based on the attack record, defining a nominal behavior:
representing the action executed by the machine during the known attack; and
executable by a target asset to emulate the action;
defining a set of alternative behaviors:
analogous to the nominal behavior; and
executable by the target asset to emulate an effect of the action at the machine on the second computer network; and
storing the nominal behavior and the set of alternative behaviors in a node in the set of nodes in the attack graph, the node corresponding to the action;
connecting nodes in the attack graph according to an order of actions in the sequence of actions representing the known attack;
scheduling a first asset on a target network to selectively execute nominal behaviors and alternative behaviors stored in the set of nodes in the attack graph during a first time period;
scheduling a second asset on the target network to selectively execute nominal behaviors and alternative behaviors stored in the set of nodes in the attack graph during the first time period;
accessing a set of alerts generated by a set of security tools, deployed on the target network, during the first time period; and
characterizing a vulnerability of the target network during the first time period based on presence of alerts, in the set of alerts, indicating detection and prevention of nominal behaviors and alternative behaviors executed by the first asset and the second asset according to the attack graph.

20. A method comprising:
accessing an attack record defining a sequence of actions executed on a machine on a second computer network and representing a known attack on the second computer network;
initializing an attack graph comprising a set of nodes;
for each action in the sequence of actions:
based on the attack record, defining a set of behaviors:
analogous to the action; and
executable by a target asset on a target network to emulate an effect of the action at the machine on the second computer network; and
storing the set of behaviors in a node in the set of nodes in the attack graph, the node corresponding to the action;
connecting nodes in the attack graph according to an order of actions in the sequence of actions representing the known attack;

scheduling a first asset on a target network to selectively execute analogous behaviors stored in the set of nodes in the attack graph during a first time period;

scheduling a second asset on the target network to selectively execute analogous behaviors stored in the set of nodes in the attack graph during the first time period;

accessing a set of alerts generated by a set of security tools, deployed on the target network, during the first time period; and characterizing a vulnerability of the target network during the first time period based on presence of alerts, in the set of alerts, indicating detection and prevention of analogous behaviors executed by the first asset and the second asset according to the attack graph.

\* \* \* \* \*